United States Patent
Jang et al.

(10) Patent No.: US 8,139,045 B2
(45) Date of Patent: Mar. 20, 2012

(54) DISPLAY DEVICE HAVING MULTI-TOUCH RECOGNIZING FUNCTION AND DRIVING METHOD THEREOF

(75) Inventors: Hyung Uk Jang, Gyeonggi-do (KR); Sang Hyuck Bae, Seoul (KR); Yeon Shim Shim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1013 days.

(21) Appl. No.: 11/798,124

(22) Filed: May 10, 2007

(65) Prior Publication Data

US 2008/0143690 A1    Jun. 19, 2008

(30) Foreign Application Priority Data

Dec. 15, 2006  (KR) .................. 10-2006-0128529
Mar. 12, 2007  (KR) .................. 10-2007-0024180

(51) Int. Cl.
*G06F 3/042* (2006.01)
(52) U.S. Cl. ........................ 345/175; 345/173
(58) Field of Classification Search .................. 345/173, 345/175; 178/18.01–18.03, 18.09, 18.11, 178/19.05
See application file for complete search history.

(56) References Cited

U.S. PATENT DOCUMENTS

| | | | |
|---|---|---|---|
| 6,269,565 B1 * | 8/2001 | Inbar et al. | 40/361 |
| 2003/0043116 A1 * | 3/2003 | Morrison et al. | 345/158 |
| 2004/0108996 A1 * | 6/2004 | McCharles et al. | 345/173 |
| 2005/0077452 A1 * | 4/2005 | Morrison et al. | 250/221 |
| 2005/0270276 A1 * | 12/2005 | Sugimoto et al. | 345/173 |

FOREIGN PATENT DOCUMENTS

CN    1704888 A    12/2005

* cited by examiner

*Primary Examiner* — Richard Hjerpe
*Assistant Examiner* — Sahlu Okebato
(74) *Attorney, Agent, or Firm* — Morgan, Lewis & Bockius LLP

(57) ABSTRACT

A display device having a multi-touch recognition function includes an integration module having a plurality of cameras integrated at an edge of a display panel; a look-up-table of a plurality of compensation angles in an range of about 0 to about 90 degrees corresponding to each of the plurality of cameras; and processor that detects a touch area using at least first and second images captured by the plurality of cameras, respectively, and compensates the detected touch area with one of the plurality of compensation angles.

11 Claims, 24 Drawing Sheets ized by two or more substantially simultaneous contact points, the touch panel might malfunction or any one of the touches can be selected by a pre-set program.

DISPLAY DEVICE HAVING MULTI-TOUCH RECOGNIZING FUNCTION AND DRIVING METHOD THEREOF

This application claims the benefit of the Korean Patent Application No. 10-2006-128529 filed on Dec. 15, 2006, and the Korean Patent Application No. 10-2007-024180 filed on Mar. 12, 2007, both of which are hereby incorporated by reference in their entirety.

BACKGROUND OF THE INVENTION

1. Field of the Invention

Embodiments of the present invention relate to a display device, and more particularly to a display device and a driving method thereof. Embodiments of the present invention are suitable for a wide scope of applications. In particular, embodiments of the present invention are suitable for compensating a lens distortion in a multi-touch recognition for a display device.

2. Description of the Related Art

Generally, a touch panel is a type of user interface that is attached to a display device with the property that an electrical characteristic thereof is changed at a contact point where a hand or a pen touches the panel. Touch panels have been used in various applications, such as in small portable terminals, office equipment and the like. However, if a multi-touch is generated by two or more substantially simultaneous contact points, the touch panel might malfunction or any one of the touches can be selected by a pre-set program.

In order to overcome the limit of multi-touch recognition in the touch panel of the related art, there has recently been developed a multi-touch recognition device which simultaneously recognizes a plurality of touches.

The multi-touch recognition device might wrongly recognize a touch location due to the aberration of lens and the like in case of using a camera having lens. Further, the multi-touch recognition device might have the location of the camera optically misaligned against the touch surface. And, because of this, an offset value exists in the angle of the touch point measured by the camera and there might be induced a difference of as much as the offset from the actual touch point. Recently, there has been an attempt of pre-calculating the offset value generated in accordance with the camera location for the touch surface in the multi-touch recognition device, storing the offset value at the memory, and reflecting the offset value to the touch point. However, the related art has no way of compensating the distortion generated in the lens itself in the multi-touch recognition device.

Further, the multi-touch recognition device has a problem in that a touch recognition circuit is separated from a drive circuit of the display device such that the display action and the touch recognition action are not synchronized, thereby realizing the circuit inefficiently.

Although there is a method of embedding an optical sensor of the multi-touch recognition device in each pixel of the display device, but this method has another problem in that the aperture ratio of the display device is decreased to lower the brightness thereof due to the optical sensor.

SUMMARY OF THE INVENTION

Accordingly, embodiments of the present invention are directed to a display device having multi-touch recognizing function and a driving method thereof, which substantially obviate one or more problems due to limitations and disadvantages of the related art.

An object of the present invention to provide a display device having multi-touch recognizing function that obtain a strong structural stability for the touch recognition system.

Another object of the present invention to provide a display device having multi-touch recognizing function that maintains an appearance of the display device.

Another object of the present invention to provide a lens distortion compensation in a multi-touch recognition for a display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described, a display device having a multi-touch recognition function includes an integration module having a plurality of cameras integrated at an edge of a display panel; a look-up-table of a plurality of compensation angles in an range of about 0 to about 90 degrees corresponding to each of the plurality of cameras; and processor that detects a touch area using at least first and second images captured by the plurality of cameras, respectively, and compensates the detected touch area with one of the plurality of compensation angles.

In another aspect, a method of recognizing a multi-touch on a display device including an integration module having a plurality of cameras assembled with a display panel and a storage part for storing a plurality of compensation angles in an range of about 0 to about 90 degrees corresponding to each of the plurality of cameras includes capturing first and second images using the cameras; detecting a touch area using the first and second images; and compensating the detected touch area with one of the plurality of the compensation angles.

In another aspect, a method of recognizing a multi-touch on a display panel of display device including first and second capture devices assembled with the display panel includes selecting a first reference on a surface of the display panel, the first reference having first and second reference angles relative to the first and second capture devices; touching the selected first reference; capturing a first captured image of the touched first reference using the first capture device; capturing a second captured image of the touched first reference using the second capture device; detecting first and second contact angles of the touched first reference relative to the first and second capture devices, respectively, by a triangulation operation on a basis of the first and second captured images; and computing first and second compensation angles corresponding to the first and second capture devices, respectively, in accordance with corresponding differences between the first and second reference angles and the first and second contact angles, respectively.

In another aspect, a method of recognizing a multi-touch on a display device including an integration module having a plurality of cameras assembled with a display panel and a storage part for storing a plurality of compensation angles in an range of about 0 to about 90 degrees corresponding to each of the plurality of cameras includes substantially simultaneously capturing first, second, third and fourth images using first, second, third and fourth cameras from the plurality of cameras; detecting one or more touch area using the first and second images; detecting the one or more touch area using the third and fourth images; compensating the detected one or more touch area with compensation angles corresponding to the first, second, third and fourth cameras, respectively; and verifying the one or more touch area detected using the first and second images with the one or more touch area detected using the third and fourth cameras.

In another aspect, a method of recognizing a multi-touch on a display panel of display device including a capture device assembled with the display panel includes selecting a reference on a surface of the display panel, the reference having a reference angle relative to the capture devices; touching the selected reference; capturing an image of the touched reference using the capture device; calculating a touched angle of the touched reference using the captured image; computing a compensation angle according to a difference between the touched angle and the reference angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of embodiments of the present invention. In the drawings.

DETAILED DESCRIPTION OF EXEMPLARY EMBODIMENTS

Reference will now be made in detail to exemplary embodiments of the present invention, examples of which are illustrated in the accompanying drawings.

Figure 1:
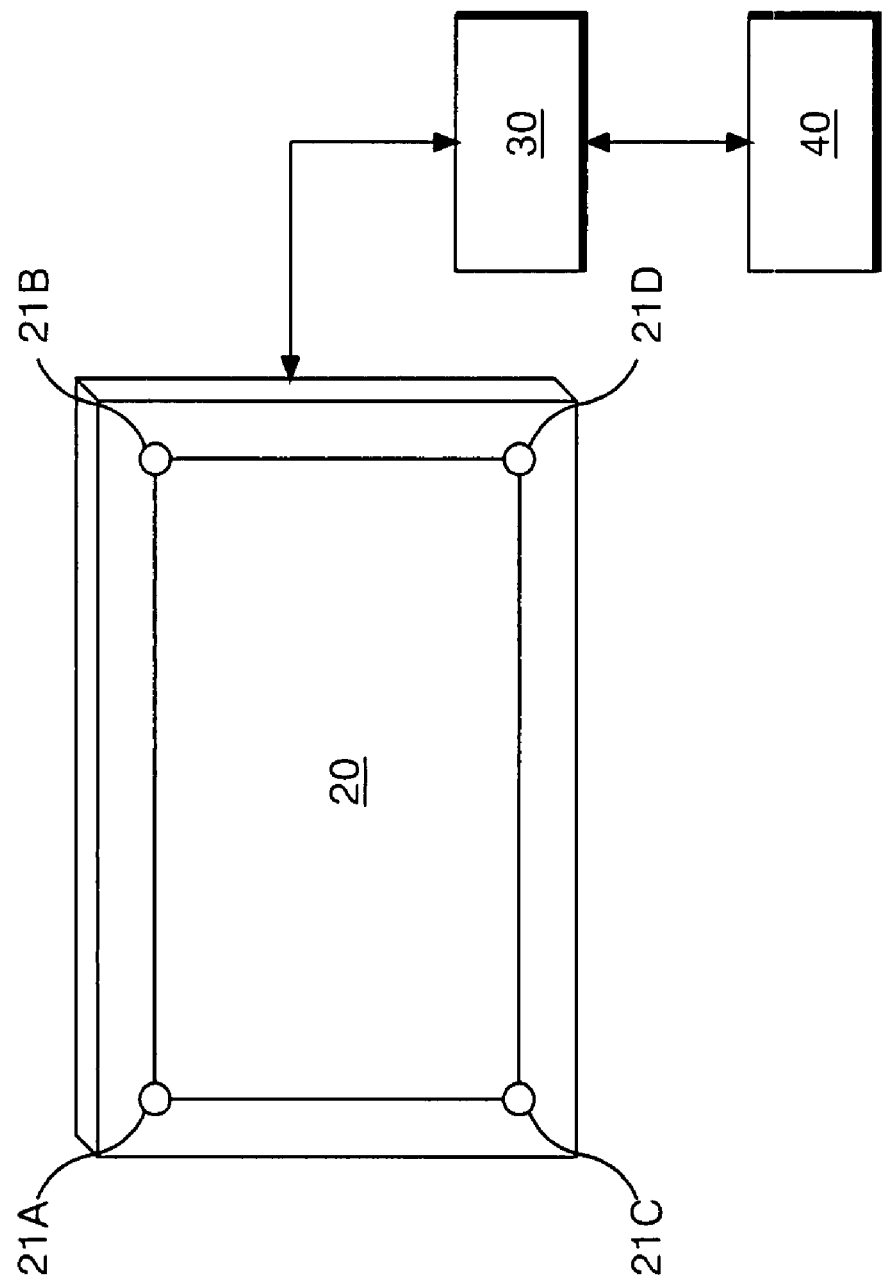
FIG. 1 shows a block diagram representation of an exemplary display device having a multi-touch recognition function according to an embodiment of the present invention.

FIG. 1 shows a block diagram representation of an exemplary display device having a multi-touch recognition function according to an embodiment of the present invention. Referring to FIG. 1, a display device having a multi-touch recognition function according to an embodiment of the present invention includes a touch and display integration module 20 where cameras 21A to 21D are disposed in four corners of a pixel array 10A on which a picture is displayed; a control board 30 which controls the touch and display integration module 20 and calculates the coordinates of a touch point; and a system 40 for supplying the data RGB that are to be displayed along with a timing signal, to the control board 30.

Figure 2:
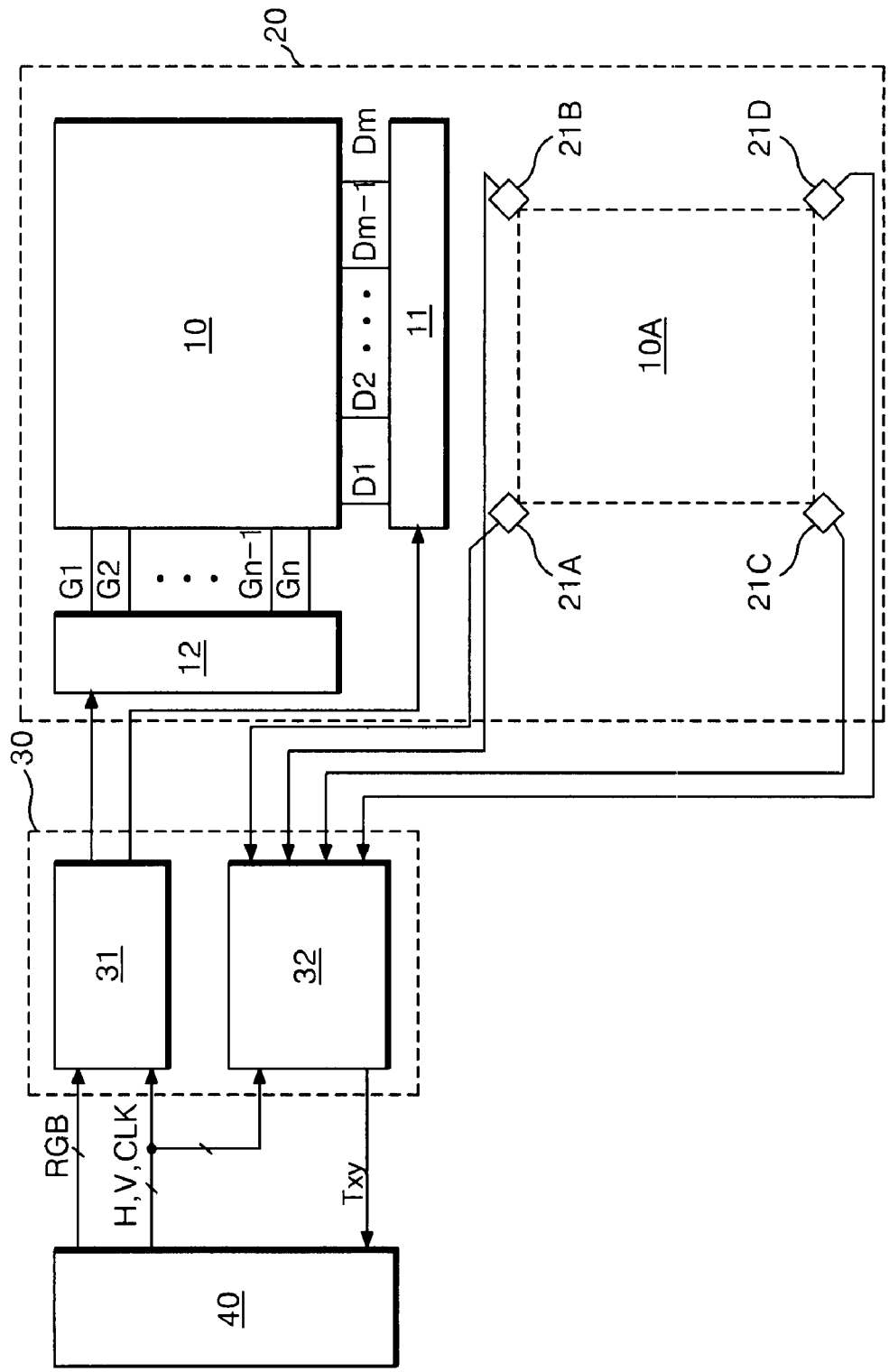
FIG. 2 shows a schematic description of the display device of FIG. 1.

FIG. 2 shows a schematic description of the display device of FIG. 1. Referring to FIG. 2, the touch and display integration module 20 includes a liquid crystal display panel 10 where a pixel array 10A on which a picture is displayed is formed; a source driver 11 for supplying data voltages to data lines D1 to Dm of the liquid crystal display panel 10; a gate driver 12 for supplying scan pulses to gate lines G1 to Gn of the liquid crystal display panel 10; and cameras 21A to 21D each disposed in the vicinity of the four corners of the liquid crystal display panel 10.

Figure 3:
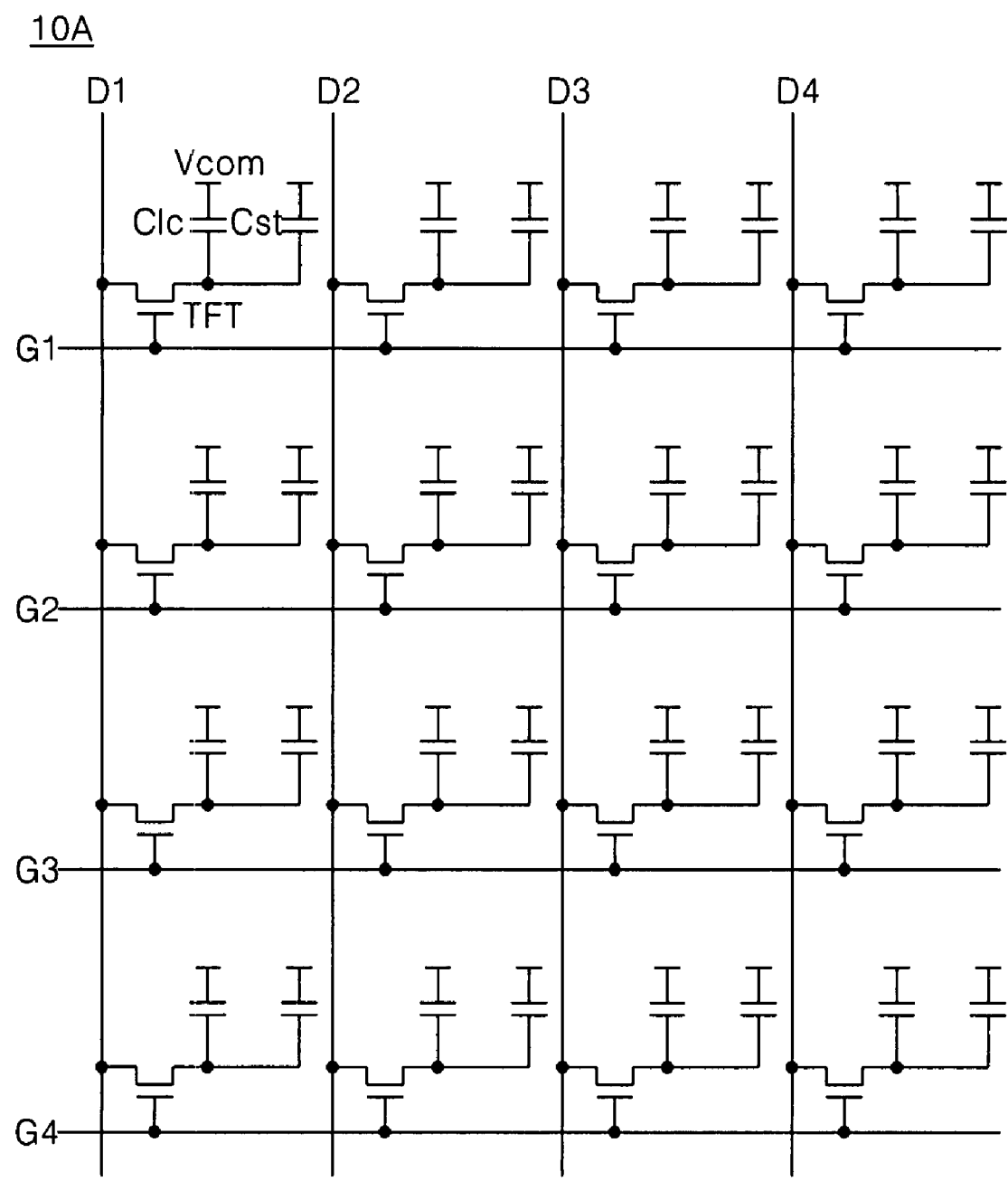
FIG. 3 shows a circuit diagram of a part of a pixel array from FIG. 2.

FIG. 3 shows a circuit diagram of a part of a pixel array from FIG. 2. Referring to FIGS. 2 and 3, the liquid crystal display panel 10 includes a thin film transistor (hereinafter, referred to as "TFT") substrate and a color filter substrate. A liquid crystal layer is formed between the TFT substrate and the color filter substrate. In the TFT substrate, the data lines D1 to Dm and the gate lines G1 to Gn are formed to perpendicularly cross each other on a lower glass substrate, and liquid crystal cells Clc are disposed in a matrix pattern in the cell areas defined by the data lines D1 to Dm and the gate lines G1 to Gn. The TFTs formed in the crossing parts of the data lines D1 to Dm and the gate lines G1 to Gn transmit the data voltages, which is supplied through the data lines D1 to Dm, to the pixel electrodes of the liquid crystal cells. To this end, a gate electrode of the TFT is connected to the gate line G1 to Gn, and a source electrode thereof is connected to the data line D1 to Dm. A drain electrode of the TFT is connected to the pixel electrode of the liquid crystal cell Clc. A common voltage Vcom is supplied to a common electrode facing the pixel electrode.

The color filter substrate includes a black matrix and color filters which are formed on an upper glass substrate.

On the other hand, the common electrode is formed on an upper glass substrate in a vertical electric field drive method such as a twisted nematic (TN) mode and a vertical alignment (VA) mode, and is formed on a lower glass substrate along with the pixel electrode in a horizontal electric field drive method such as an in-plane switching (IPS) mode and a fringe-field switching (FFS) mode.

A storage capacitor Cst can be formed by overlapping the gate line and the pixel electrode of the liquid crystal cell Clc. Alternatively, the storage capacitor Cst can also be formed by overlapping the pixel electrode and the separate common line.

The source driver 11 includes a plurality of data integrated circuits (hereinafter, referred to as "IC"). The source driver 11 converts digital video data RGB inputted from the control board 30 into positive or negative analog gamma compensation voltages under control of the control board 30, and supplies the analog gamma compensation voltages to the data lines D1 to Dm as analog data voltages.

The gate driver 12 includes a plurality of gate ICs. The gate driver 12 sequentially supplies scan pulses to the gate lines G1 to Gn under control of the control board 30. The data ICs of the source driver 11 and the gate ICs of the gate driver 12 might be formed on the lower glass substrate by a chip-on-glass (COG) method or a tape-automated-bonding (TAB) method using a tape carrier package (TCP). The gate ICs of the gate driver 12 might be directly formed on the lower glass substrate by the same process as the TFT process at the same time when the TFTs of the pixel array 10A are formed.

The cameras 21A to 21D can be, for example, CMOS (complementary metal oxide semiconductor) sensors. The cameras 21A to 21D can be positioned at the four corners of the pixel array 10A on the liquid crystal display panel 10. Each of the cameras 21A to 21D takes the image of the surface of the display panel corresponding to the pixel area and the vicinity thereof. The CMOS sensor used as the camera 21A to 21D can have a resolution from about 320×240 pixels to about 1280×1024 pixels. The touch image taken from each of the cameras 21A to 21D is supplied to the control board 30.

Figure 4:
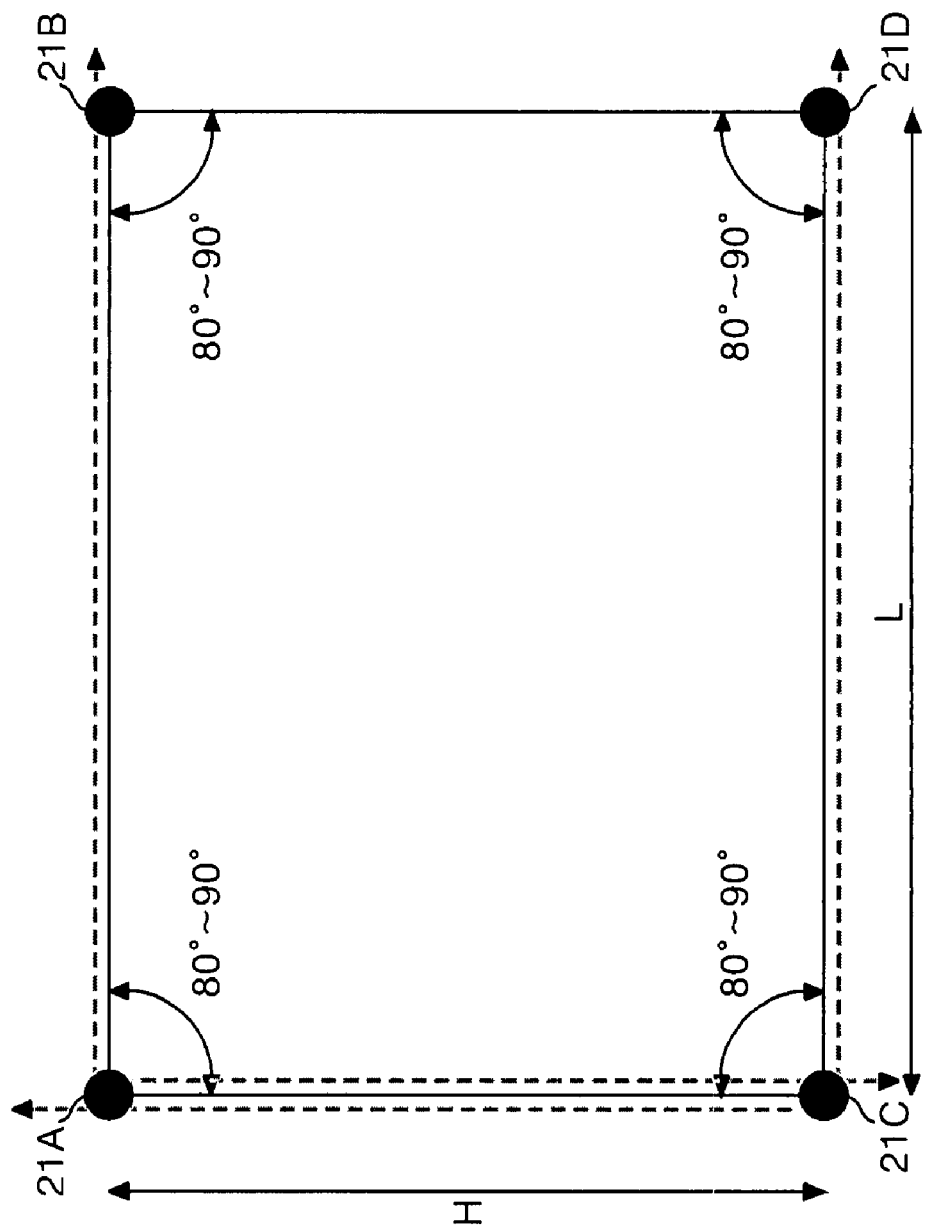
FIG. 4 illustrates exemplary angles of view for cameras attached to a display according to an embodiment of the present invention.

FIG. 4 illustrates exemplary angles of view for cameras attached to a display according to an embodiment of the present invention. Referring to FIG. 4, the lens angle of view of each camera 21A to 21D is chosen to be about 90°. The lens angle of view of cameras 21A to 21D can be changed in accordance with the distance between the liquid crystal display panel 10 and the cameras 21A to 21D, or a size of the liquid crystal display panel 10. In an embodiment of the invention, the viewing angle of each of the lenses 21A to 21D is around 80°-90°. This is because if the lens angle of view of the cameras 21A to 21D becomes narrow than 80°, a shade area not taken by the cameras 21A to 21D increases, thereby preventing a correct detection of the multi-touch area. Moreover, if the lens angle of view is wider than 90°, an extraneous part off the liquid crystal display panel is included, also preventing a correct detection of the multi-touch area.

Figure 5:
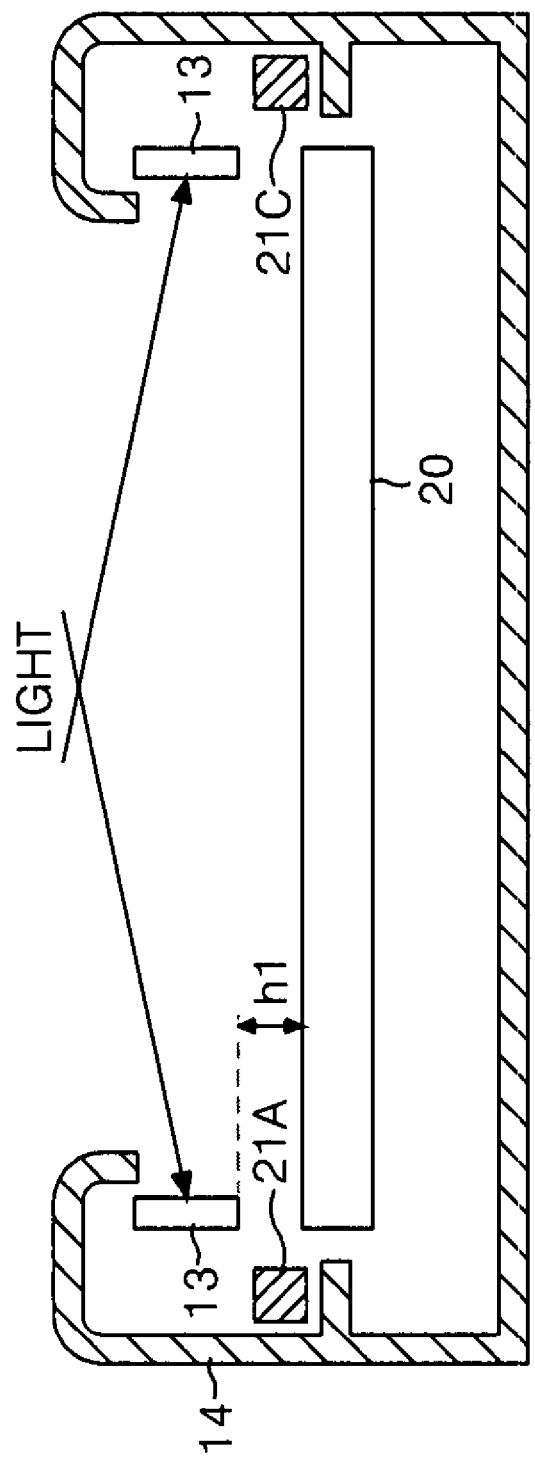
FIG. 5 is a cross sectional view of the display device of FIG. 1 showing exemplary positions of non-reflective members according to an embodiment of the present invention.

FIG. 5 is a cross sectional view of the display device of FIG. 1 showing exemplary positions of non-reflective members according to an embodiment of the present invention. Referring to FIG. 5, non-reflective members 13 are installed in the vicinity of the edge of the glass substrate of the liquid crystal display panel 10. The non-reflective members 13 includes any one of an anti-reflector, a black layer and two sheets of polarizing filters which are deposited for their optical absorption axes to cross each other. The non-reflective members 13 are disposed in front of the lens of the cameras 21A to 21D, and are lifted upward as much as a designated height (h1) from the surface of the glass substrate. The height (h1) between the non-reflective members 13 and the surface of the glass substrate of the liquid crystal display panel 10 is inversely proportional to the size of the liquid crystal display panel 10, is proportional to the distance between the glass substrate and the camera lens. In an embodiment, the height h1 is in a range from a few to dozens of mm.

The non-reflective members 13 and the cameras 21A to 21D are fixed to the edge of a bracket 14 which supports the touch and display integration module 20. The non-reflective members 13 absorbs or shields an external light and acts to prevent an optical interference phenomenon caused by the external light incident to the lens of the cameras 21A to 21D.

The control board 30 is connected to the source driver 11 and the gate driver 12 through a flexible printed circuit (FRC) and a connector. The control board 30 includes a timing controller 31 and a multi-touch processor 32. The timing controller 31 generates a gate control signal for controlling the operation timing of the gate driver 12 and a data control signal for controlling the operation timing of the source driver 11, in use of vertical/horizontal signals V,H and a clock CLK. Further, the timing controller 31 supplies the digital video data RGB inputted from the system 40 to the source driver 11.

The multi-touch processor 32 compensates the distortion caused by the lens characteristic of the cameras 21A to 21D by executing a multi-touch signal processing program, and extracts the touch image by comparing a background image taken previously with a touch image taken currently by the cameras 21A to 21D.

Herein, the background image taken previously by the cameras 21A to 21D is stored at a memory of the multi-touch processor 32. And, the multi-touch processor 32 calculates the coordinates for the touch image and supplies the result Txy thereof to the system 40. The multi-touch processor 32 shares the timing signal such as the vertical/horizontal synchronization signals V, H and the clock CLK with the timing controller 31, thereby operating in synchronization with the timing controller 31. Accordingly, because the timing controller 31 is synchronized with the multi-touch processor 32, the display of the composite image of the touch image and the background image displayed in the liquid crystal display panel 10 and the coordinate calculation processing of the touch point can be synchronized.

The system 40 includes a memory in which an application program is embedded; a central processing unit (CPU) for executing the application program; and a graphic-processing circuit for compounding the background image and the touch image and processing the signal interpolation of the composite data, the resolution conversion thereof and the like. The system 40 receives the coordinate data Txy from the multi-touch processor 32 and executes the application program linked to the coordinate value of the coordinate data. For example, if there is an icon of a specific program in coordinates of a touch point, the system 40 loads the program into the memory and executes the program. Further, the system 40 might be implemented on a personal computer (PC), and interchanges data with the multi-touch processor 32 through a serial or universal serial bus USB interface.

Figure 6:
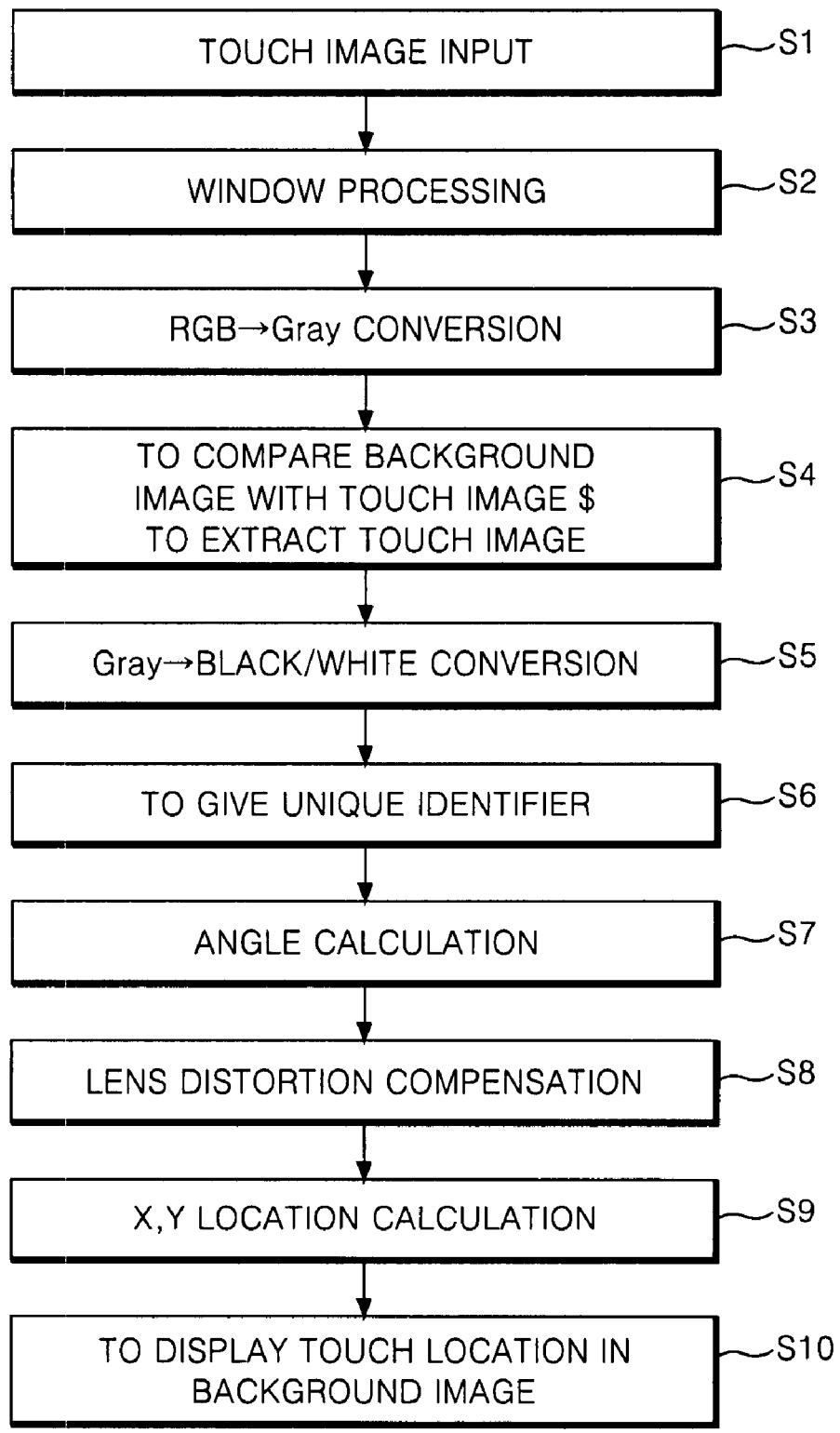
FIG. 6 is a flow chart representing a control sequence of a multi-touch signal processing program according to an embodiment of the present invention.
Figure 7:
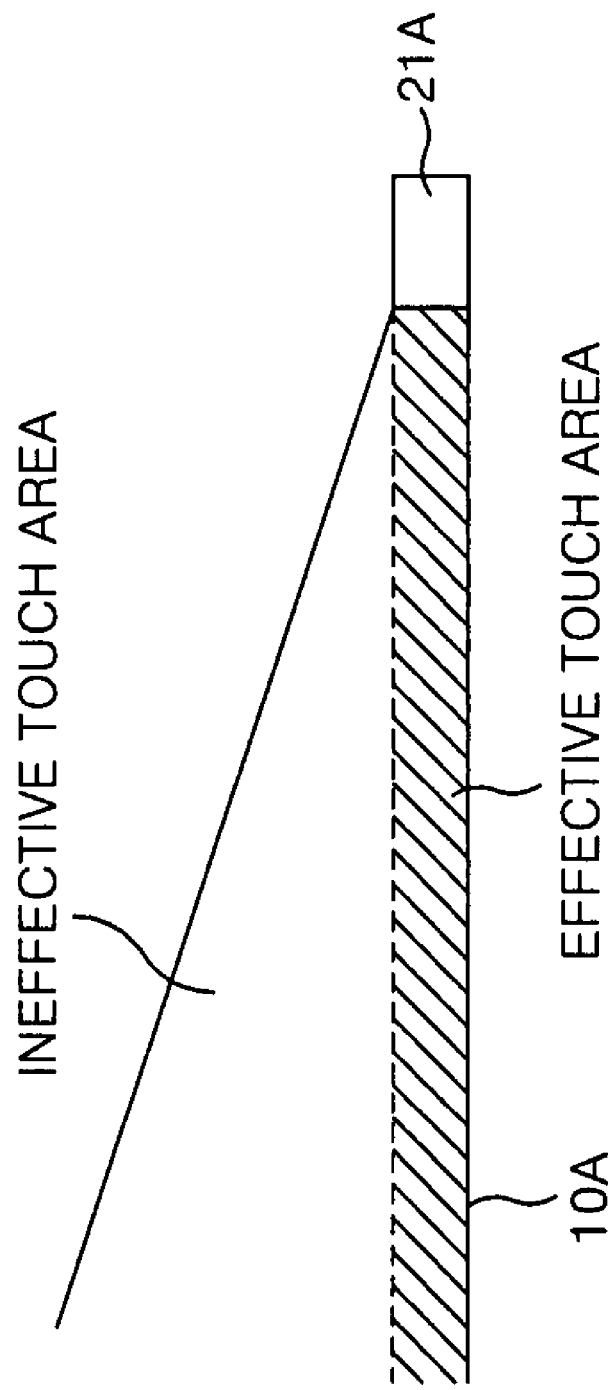
FIG. 7 shows exemplary touch areas on a display device according to an embodiment of the present invention.

FIG. 6 is a flow chart representing a control sequence of a multi-touch signal processing program according to an embodiment of the present invention. FIG. 7 shows exemplary touch areas on a display device according to an embodiment of the present invention. Referring to FIG. 6, the multi-touch signal processing program receives the touch image taken by the cameras 21A to 21D and extracts the image of an effective touch area through a window processing. (S1 and S2). Referring to FIG. 7, the touch image taken from the cameras 21A to 21D includes the image of an ineffective touch area pertinent to the space above the touch surface as well as the image of an effective touch area taken in the touch surface of the pixel array. Accordingly, the multi-touch signal processing program extracts the image (shaded part) of the effective touch area where the touch is made in the vicinity of the touch surface from the image taken from each camera 21A to 21D, through the window processing. The window processing uses an image extraction technique that a target image is only extracted for the input image signal through a submatrix operation.

Subsequently, the multi-touch signal processing program converts R, G, B data included in the image of the effective touch area extracted by the window processing into gray level values or gray scale intensities. (S3). The image taken by the cameras 21A to 21D includes R, G, B data, and the effective touch image extracted by the window processing also includes R, G, B data. The R, G, B data from the effective touch image are converted into the gray scale values in accordance with Mathematical Formula 1 below in the step of S3. To detect the touch information, the gray level values in the background image displayed in the pixel area 10A of the liquid crystal display panel 10 and the gray level values of the image captured by the cameras are compared on the basis of the gray level.

$$\text{Gray scale intensity} = pR + qG + sB \quad \text{[Mathematical Formula 1]}$$

Herein, 'p', 'q' and 's' are constants having different values from each other.

In an embodiment of the invention, touch image detection is performed by comparing a background image, which is for example the image displayed in the pixel area 10A of the liquid crystal display panel 10 to the image captured by one of the cameras 21A to 21D to extract the corresponding touch image showing where the actual touch is made. In another embodiment, touch image detection is performed by comparing a previously stored image captured by one of the cameras 21A to 21D with a new image captured by the corresponding one of the cameras 21A to 21D to extract the corresponding touch image showing where the actual touch is made. The extraction of the touch image can be achieved, for example, by a difference operation between the background (or the previously stored captured image) with the new captured image. (S4).

Subsequently, the multi-touch signal processing program compares the gray scale intensity of the touch image extracted in S4 with the pre-set threshold value. And, the multi-touch signal processing program converts the gray scale intensity of the touch image into white data only for the data of not less than the threshold value, and converts the data of below the threshold value into the black data. (S5) The white data represent an effective touch location, and the black data represent the ineffective data which are not actually touched in the touch image. The threshold value can be determined by experiments.

Figure 8:
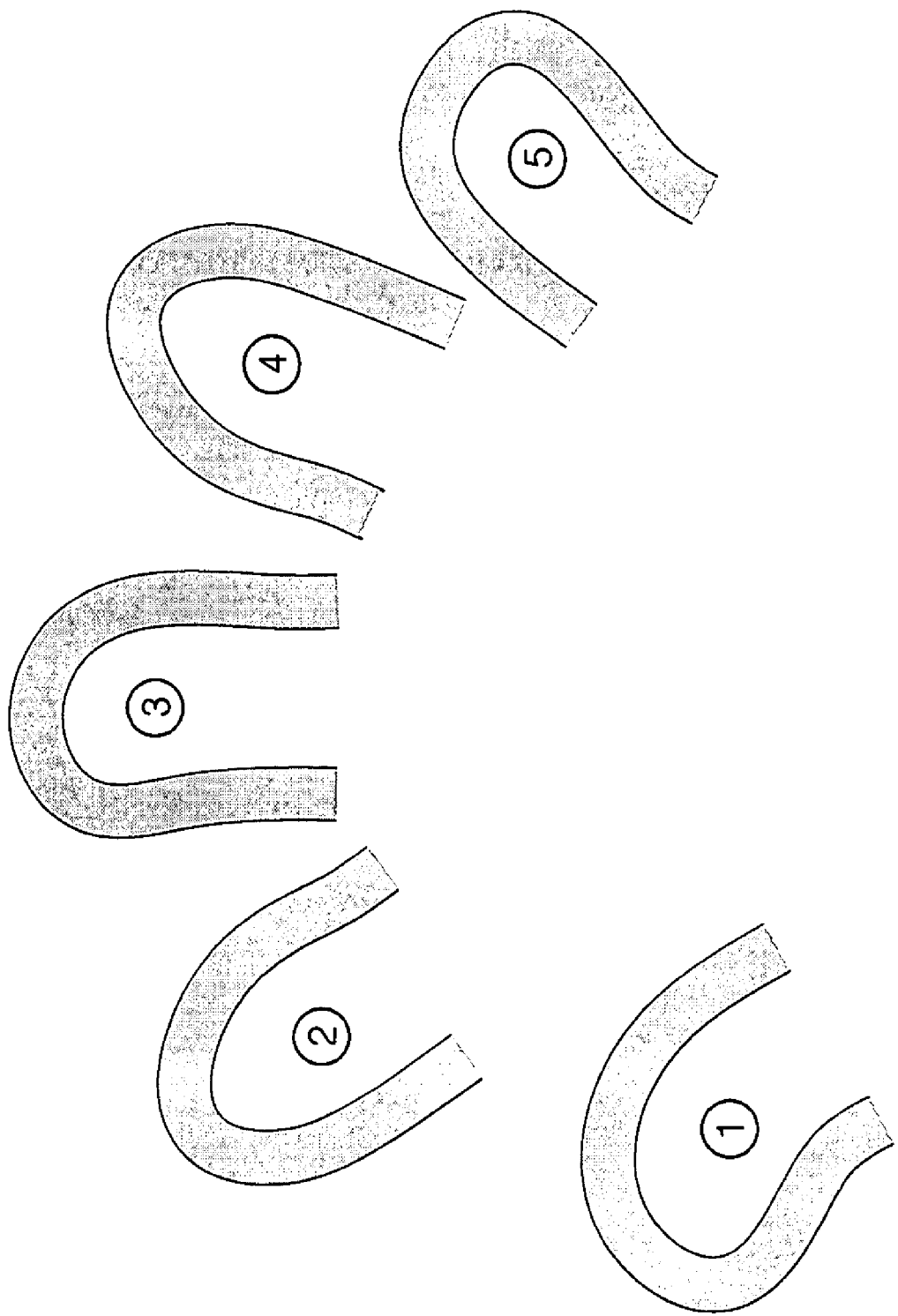
FIG. 8 shows a schematic description of exemplary touch areas identification according to an embodiment of the present invention.

FIG. 8 shows a schematic description of exemplary touch areas identification according to an embodiment of the present invention. Referring to FIG. 8, in the step of S6, the multi-touch signal processing program identifies detected touch areas using a unique identifier (1 to 5, for example) for each of the white data, i.e., effective touch location data.

Subsequently, the multi-touch signal processing program measures the angle of the camera, which faces the effective touch locations, in use of an angle calculation algorithm in order to find the location on the two-dimensional plane for each of the effective touch locations converted into the white data. (S7)

Each of the measurement angles between the camera and the effective touch locations measured in the step of S7 includes the distortion amount of as much as the lens aberration of the cameras 21A to 21D. Accordingly, the multi-touch signal processing program registers a compensation value for each angle between the effective touch location and the camera in a lookup table and adds the compensation angle from the lookup table to the measurement angle, thereby compensating the distortion amount caused by the lens characteristic in the measurement angle. (S8). A lens distortion compensation method is divided into a first embodiment and a second embodiment.

Figure 9:
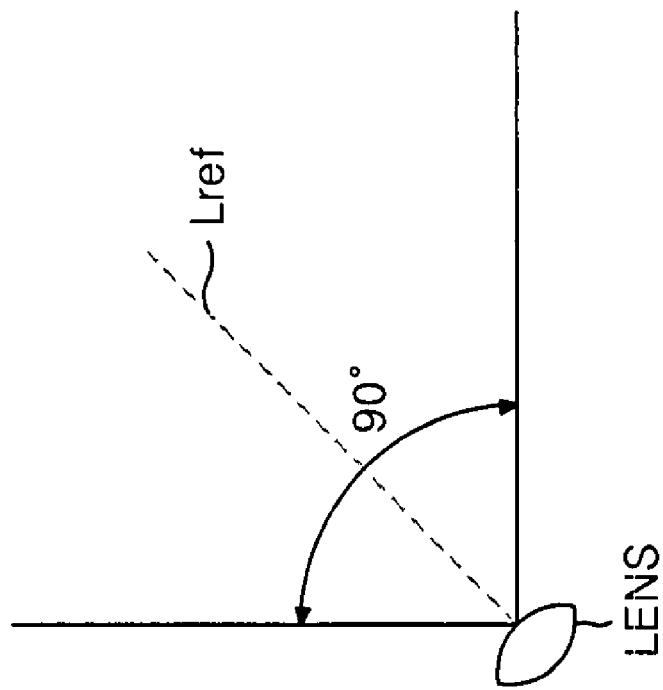
FIG. 9 is a diagram schematically showing an angle of view of lens which is 90°.

A lens distortion compensation method according to a first embodiment of the present invention will be explained in conjunction with FIGS. 9 to 11. In the lens of the cameras 21A to 21D, if the angle of view is 90°, the distortion by the lens aberration satisfies a bilateral symmetry on the basis of a reference line Lref pertinent to 45° by the lens characteristic, as in FIG. 9.

Figure 10:
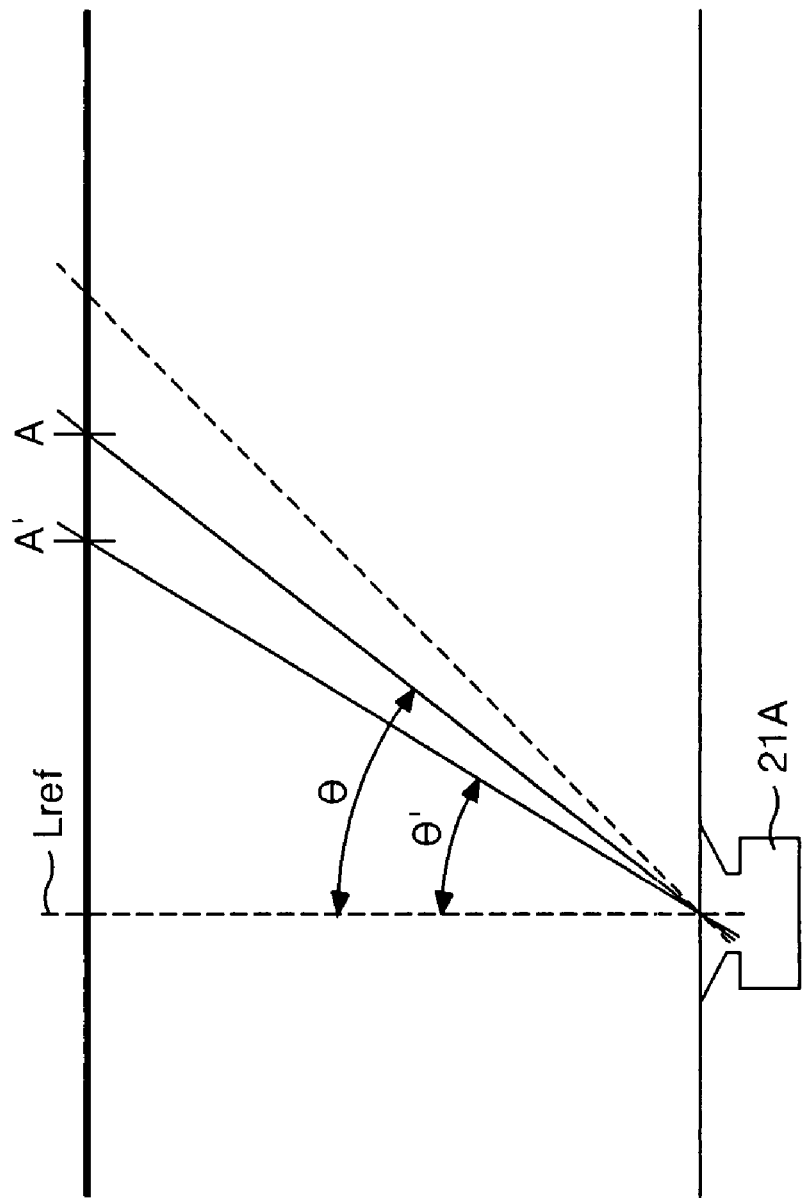
FIG. 10 is a diagram showing a touch location that is distorted by lens distortion.

FIG. 10 schematically represents a distortion model of the lens exemplified in the right surface of the reference line. If the camera 21A faces an effective touch location 'A', the measurement angle of the effective touch location where the actual touch is made should be 'θ', but the camera 21A recognizes the effective touch point as 'A' located in the mis-recognized measurement angle 'θ'' because of the lens aberration. Accordingly, the measurement angle where the lens aberration is not compensated includes an error of as much as "θ-θ'". In order to compensate the error of the measurement angle, the multi-touch signal processing program calculates the compensation angle for the measurement angle "θ'" of not higher than 45° in use of the compensation formula such as Mathematical Formula 2 below.

$$A = \tan\theta$$

$$A' = c \times (A \times \sin(90-\theta)/\sin(90-0.5\theta)) \times \sin(90-0.5\theta)$$

$$\theta' = \arctan(A')$$

$$\theta_{error} = \theta - \theta' \quad \text{[Mathematical Formula 2]}$$

Herein, 'c' is a constant value, i.e., lens coefficient, representing a unique characteristic of lens, and has a value of $0 < c \leq 1$.

The compensation angle $\theta_{error}$ obtained by Mathematical Formula 2 can be obtained in all the angles of 0°-45°.

Figure 11:
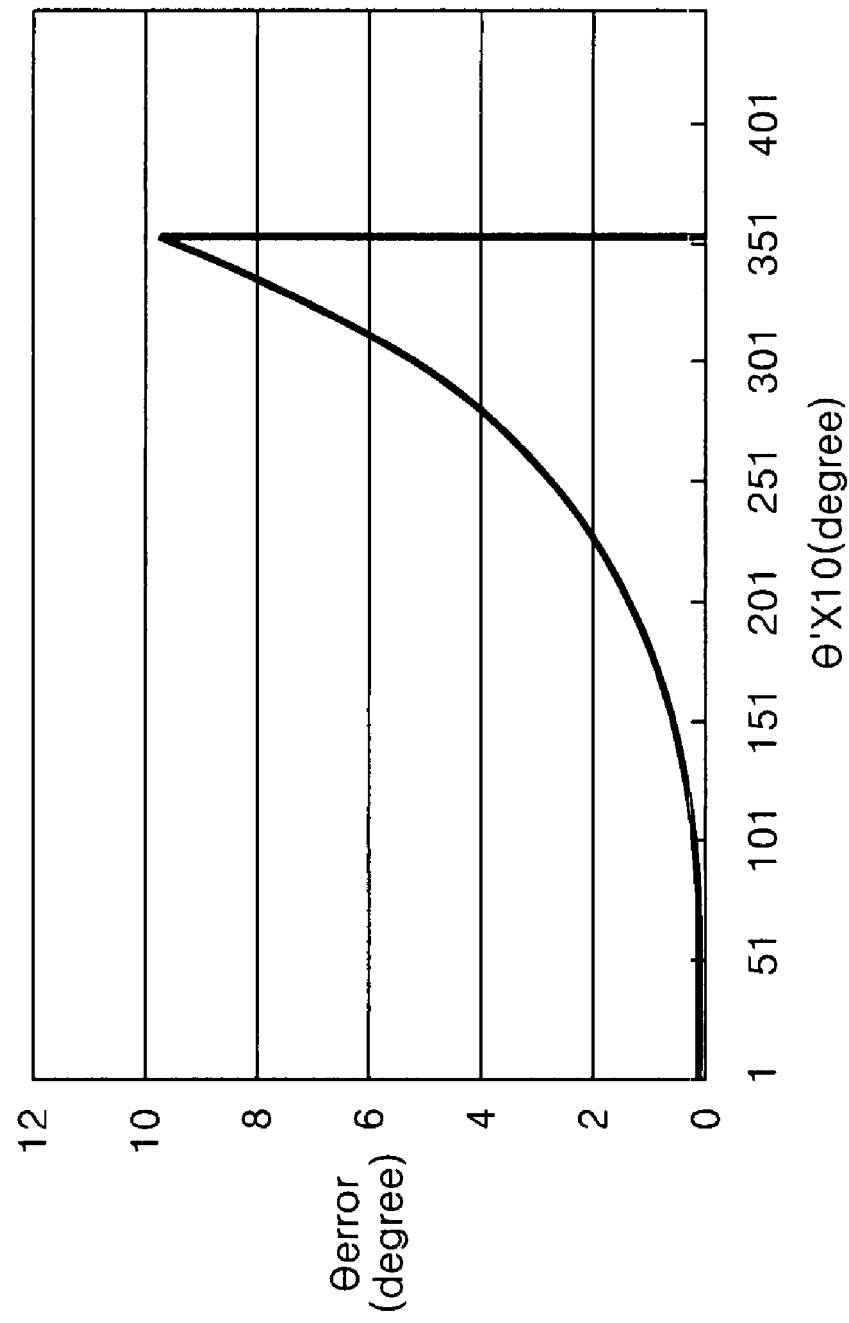
FIG. 11 is a graph showing an example of a correction angle generated in a lens distortion compensation method according to a second embodiment of the present invention.

FIG. 11 represent a compensation angle $\theta_{error}$ calculated by Mathematical Formula 2 in an angle of 0°-35.1° when assuming that the lens coefficient 'c' is 1. In FIG. 11, the horizontal axis is 10×the measurement angle (θ') to which the distortion caused by the lens aberration is reflected, and the longitudinal axis is the compensation angle $\theta_{error}$ calculated by Mathematical Formula 2. As can be known in FIG. 11, the compensation angle $\theta_{error}$ non-linearly increases as the angle is higher. The compensation angle $\theta_{error}$ for the measurement angle (θ') of 45°-90° is an angle of 0°-45°. This is because the amount of distortion caused by the lens aberration is symmetric on the basis of the lens angle of view 45°, as described above. For example, the compensation angle $\theta_{error}$ of 60° is the same as the compensation angle of 30° calculated by Mathematical Formula 2. The compensation angle $\theta_{error}$ of 0°-90° calculated in this way is mapped to each measurement angle, thereby being registered in the lookup table. The lookup table is stored at an embedded memory of the multi-touch processor 32.

Figure 12:
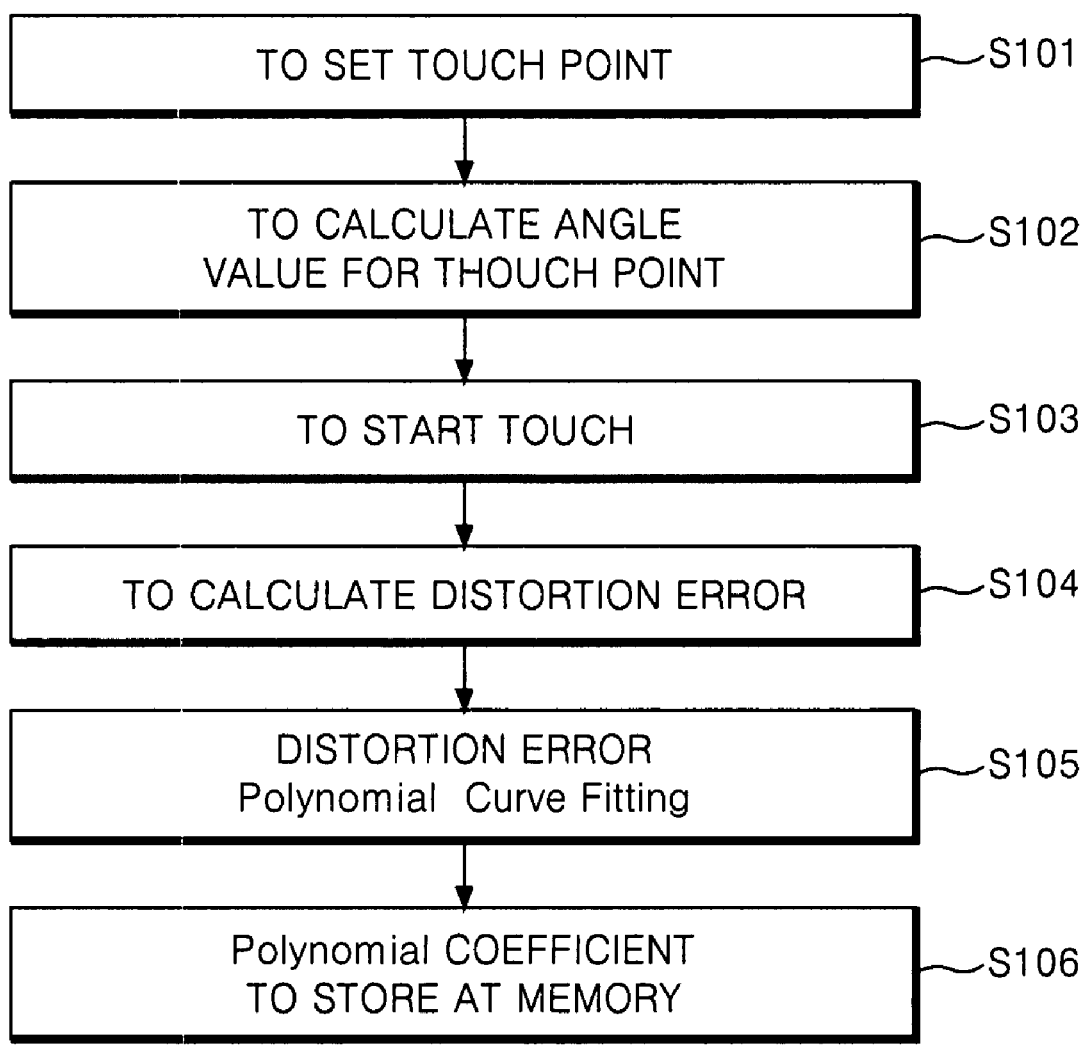
FIG. 12 is a flow chart representing a control sequence of a lens distortion compensation method according to the second embodiment of the present invention.
Figure 13:
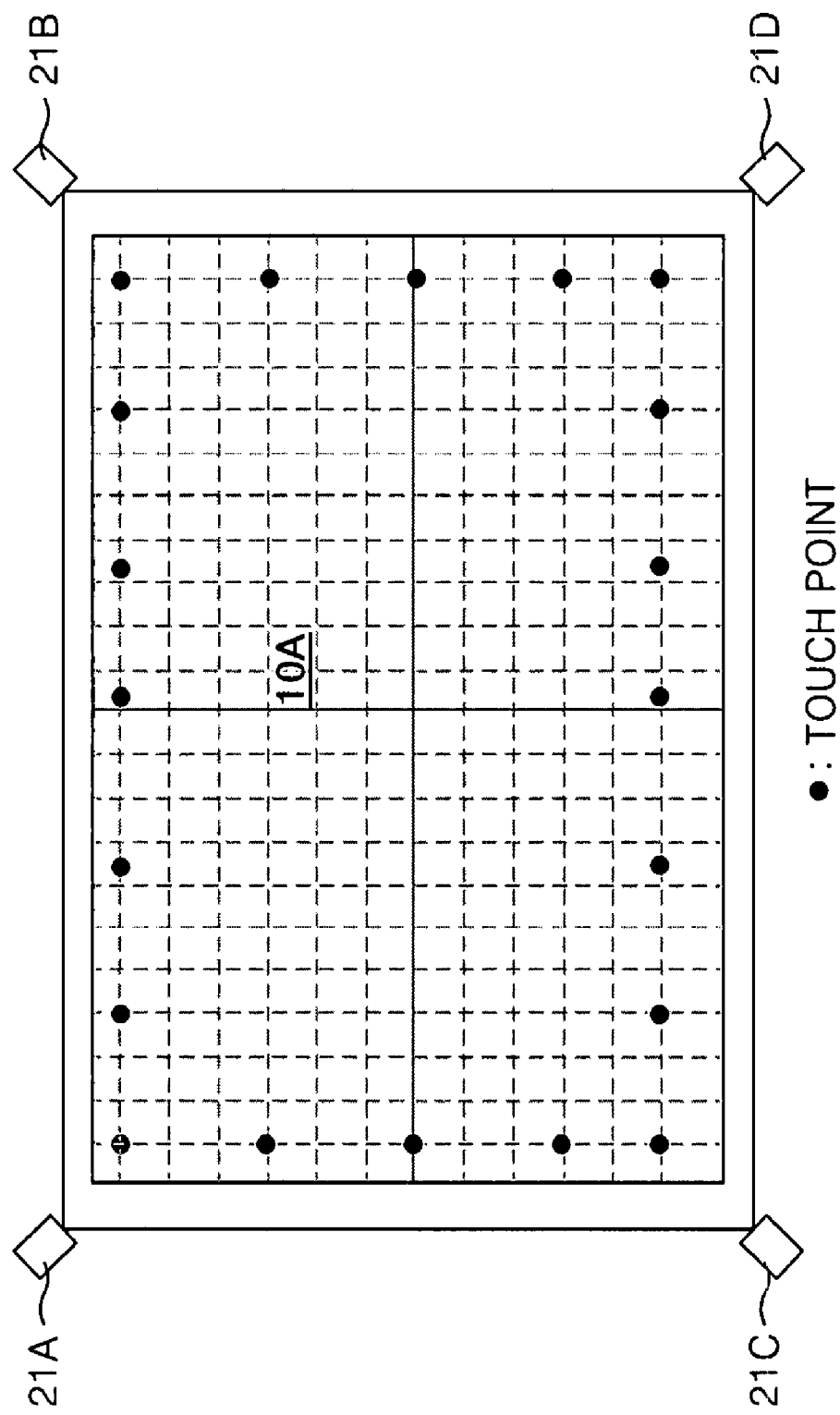
FIG. 13 is a diagram representing an example of touch points which are to be touched sequentially by a user.

A lens distortion compensation method according to a second embodiment of the present invention will be explained in conjunction with FIGS. 12 to 19. Referring to FIG. 12, the lens distortion compensation method according to the second embodiment of the present invention sets reference touch points required for a lens distortion calculation. (S101) The reference touch points are set to be N in the vicinity of the touch surface of the pixel array 10A, as in FIG. 13. For example, N can be between 5-90.

Figure 14:
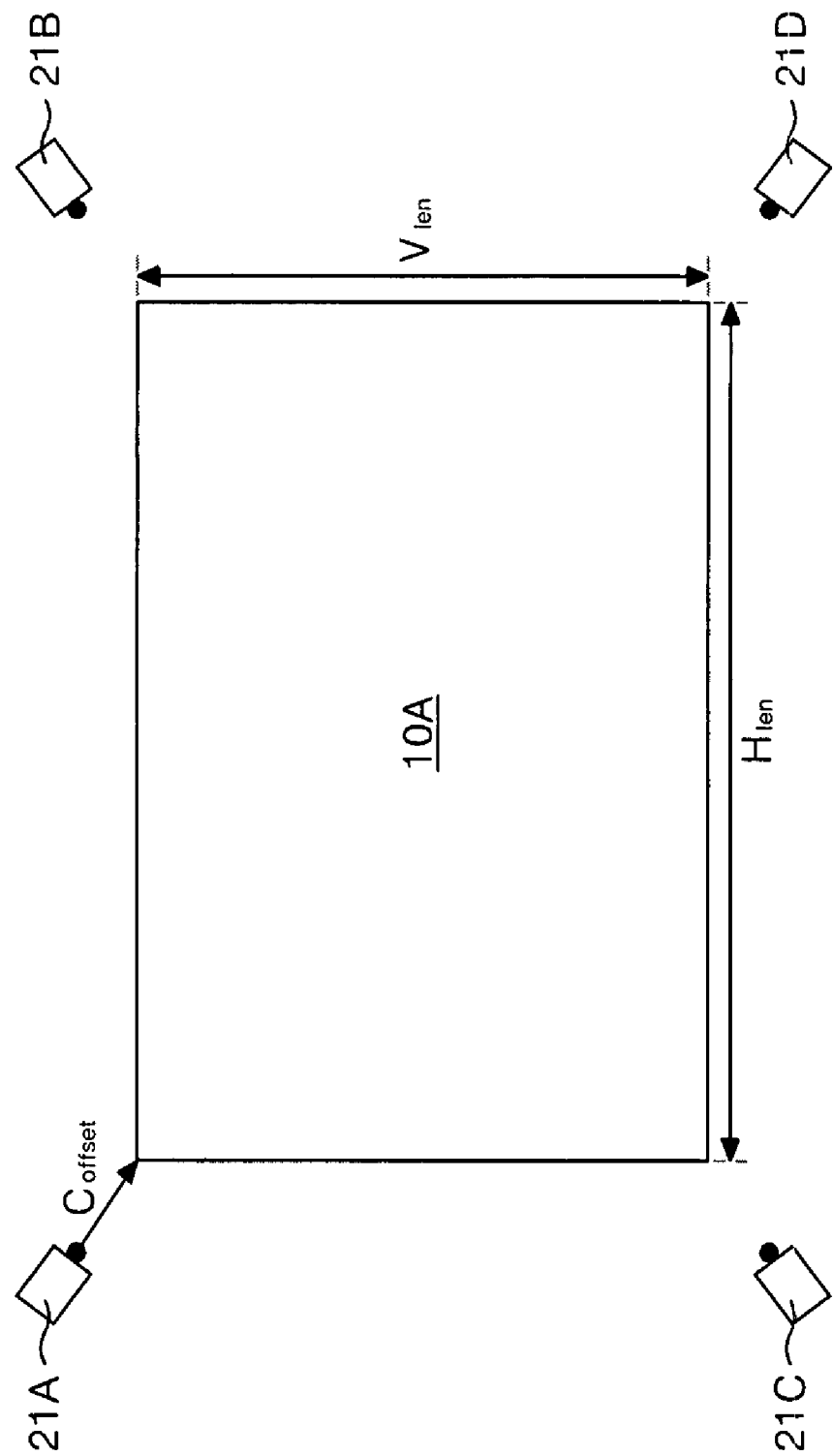
FIG. 14 to FIG. 17 are diagrams showing in detail an angle calculating process for the touch points in FIG. 13.
Figure 15:
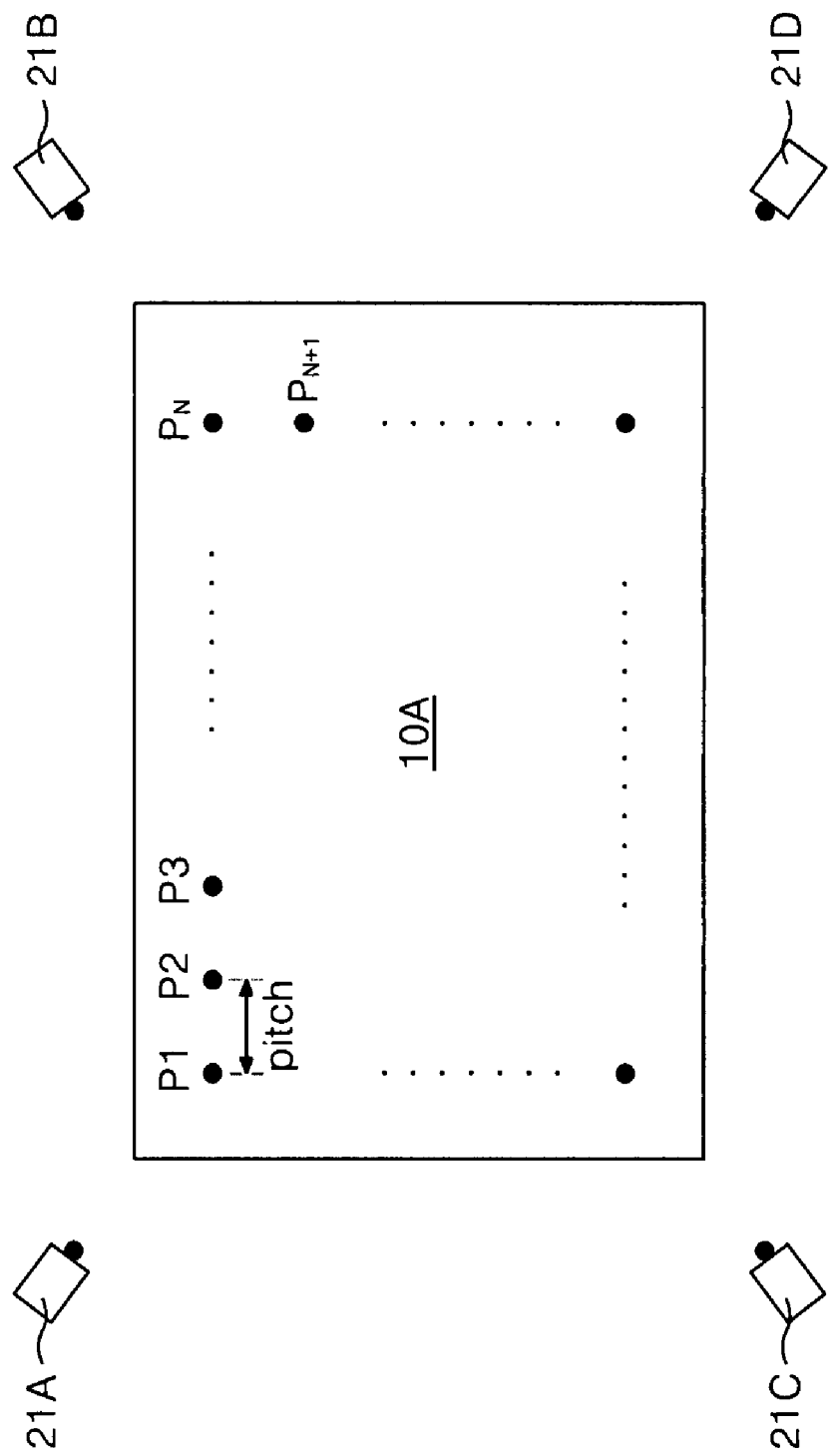
Figure 16:
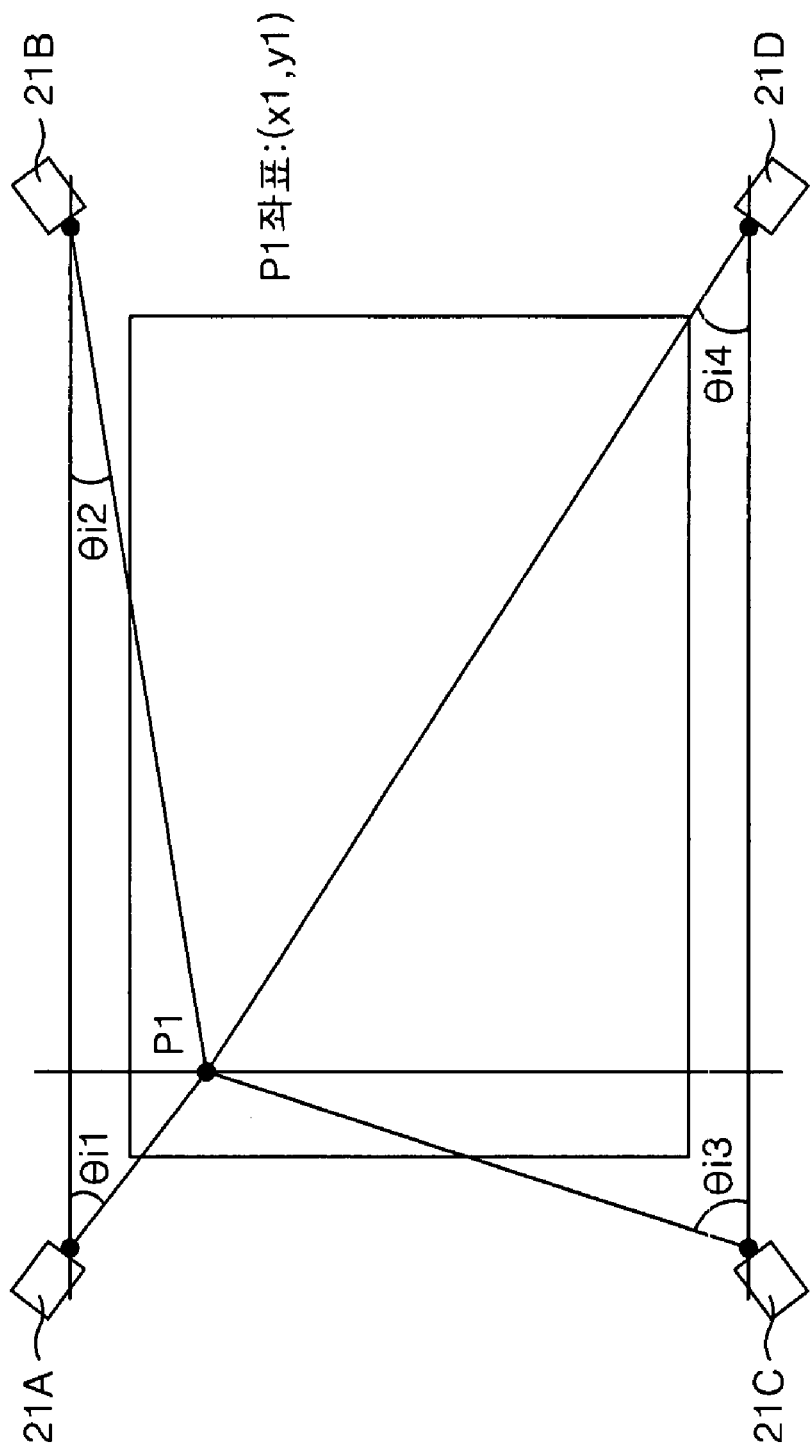

Subsequently, a reference angle is calculated for each camera 21A to 21D corresponding to each of the reference touch points, (S102) The reference angle calculation in the step S102 is made by a trigonometric function inclusive of a horizontal and vertical distances of the pixel array 10A, the location values of the cameras 21A to 21D and the location of the reference touch point, and does not take into consideration the lens aberration. This will be described in conjunction with FIG. 14 to FIG. 17. In FIG. 14, "Coffset" represents a distance between the cameras 21A to 21D and the pixel array 10A, "Hlen" represents a horizontal distance of the pixel array 10A, and "Vlen" represents a vertical distance of the pixel array 10A. Such parameters are differentiated depending upon a size of the pixel array 10A and the location values of the cameras 21A to 21D. After being set the parameters like FIG. 14, if the user sets 'P1' within the pixel array 10A by use of a user interface, and inputs a pitch between 'P1' and 'P2' as shown in FIG. 15, a plurality of touch points which are spaced as much as the pitch are automatically generated along the clockwise rotation within the pixel array 10A, and are sequentially displayed within the pixel array 10A. Herein, 'P1' is primarily displayed of the touch points, and 'P2' is adjacent to 'P1' in the clockwise rotation. It assumes that a value of the coordinate of 'P1' is (x1, y1). The user sequentially touches the displayed touch points. An angle of ideal cameras 21A to 21D which are not reflected the lens aberration for each touch point by such a touch operation is calculated in use of a trigonometric function such as Mathematical Formula 3 below.

Figure 17:
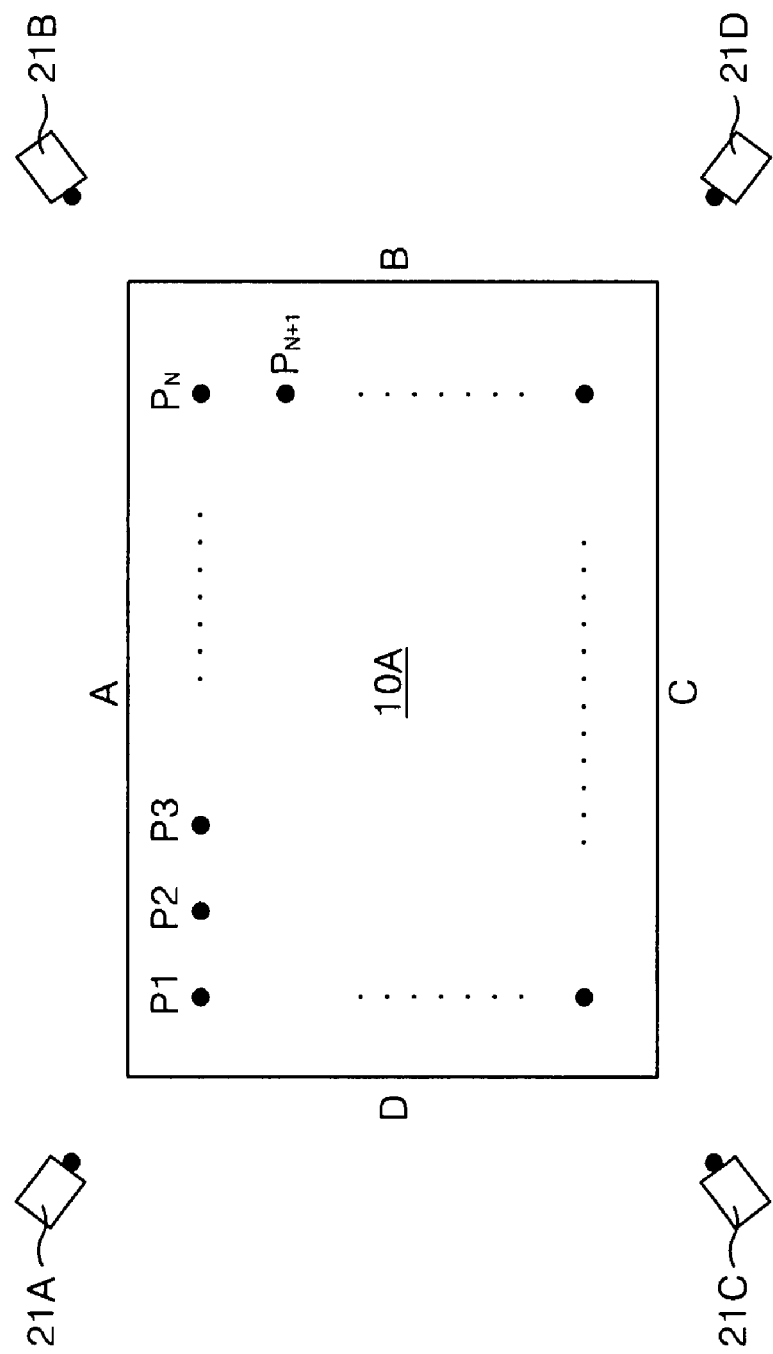

The first camera 21A measures touch points which exist at a 'B' and 'C' surfaces in FIG. 17, and the second camera 21B measures touch points which exist at a 'C' and 'D' surfaces in FIG. 17. The third camera 21C measures touch points which exist at a 'A' and 'B' surfaces in FIG. 17, and the fourth camera 21D measures touch points which exist at a 'A' and 'D' surfaces in FIG. 17. If a distance between the cameras 21A to 21D and the touch point becomes short, a size of the touch point is shown much larger than it really is. Thus, the touch point may be incorrectly recognized. Since the above-mentioned problem, the cameras 21A to 21D are used at a measurement of a touch point which exists at a relative remote location. Four number of cameras are all used for each touch point in a verifying process below.

[Mathematical Formula 3]

$$\theta i1 = \arctan\left(\frac{C_{offset}/\sqrt{2} + y1}{C_{offset}/\sqrt{2} + x1}\right)$$

$$\theta i2 = \arctan\left(\frac{C_{offset}/\sqrt{2} + y1}{H_{len} + C_{offset}/\sqrt{2} - x1}\right)$$

$$\theta i3 = \arctan\left(\frac{V_{len} + C_{offset}/\sqrt{2} - y1}{C_{offset}/\sqrt{2} + x1}\right)$$

$$\theta i4 = \arctan\left(\frac{V_{len} + C_{offset}/\sqrt{2} - y1}{H_{len} + C_{offset}/\sqrt{2} - x1}\right)$$

The calculated value of the touch points becomes the criteria for calculating the error with the measurement value, which is measured when actually touched, for the touch points in the step of S104.

If the touch points are sequentially displayed and a user sequentially touches the touch points displayed on a screen, the angle of the camera for the touch point is measured. (S103) The angle measurement of the step S1103 is calculated by the triangulation later described, and includes the distortion amount according to the lens aberration. Between the angle of the measured value and the angle of the value calculated in the step of S102 is an error by the aberration of the lens, as in FIG. 8. The error is calculated for each angle within the angle range, i.e., 0°-90°, of the touch surface which the camera faces, thereby being stored at the memory. (S104)

Figure 18:
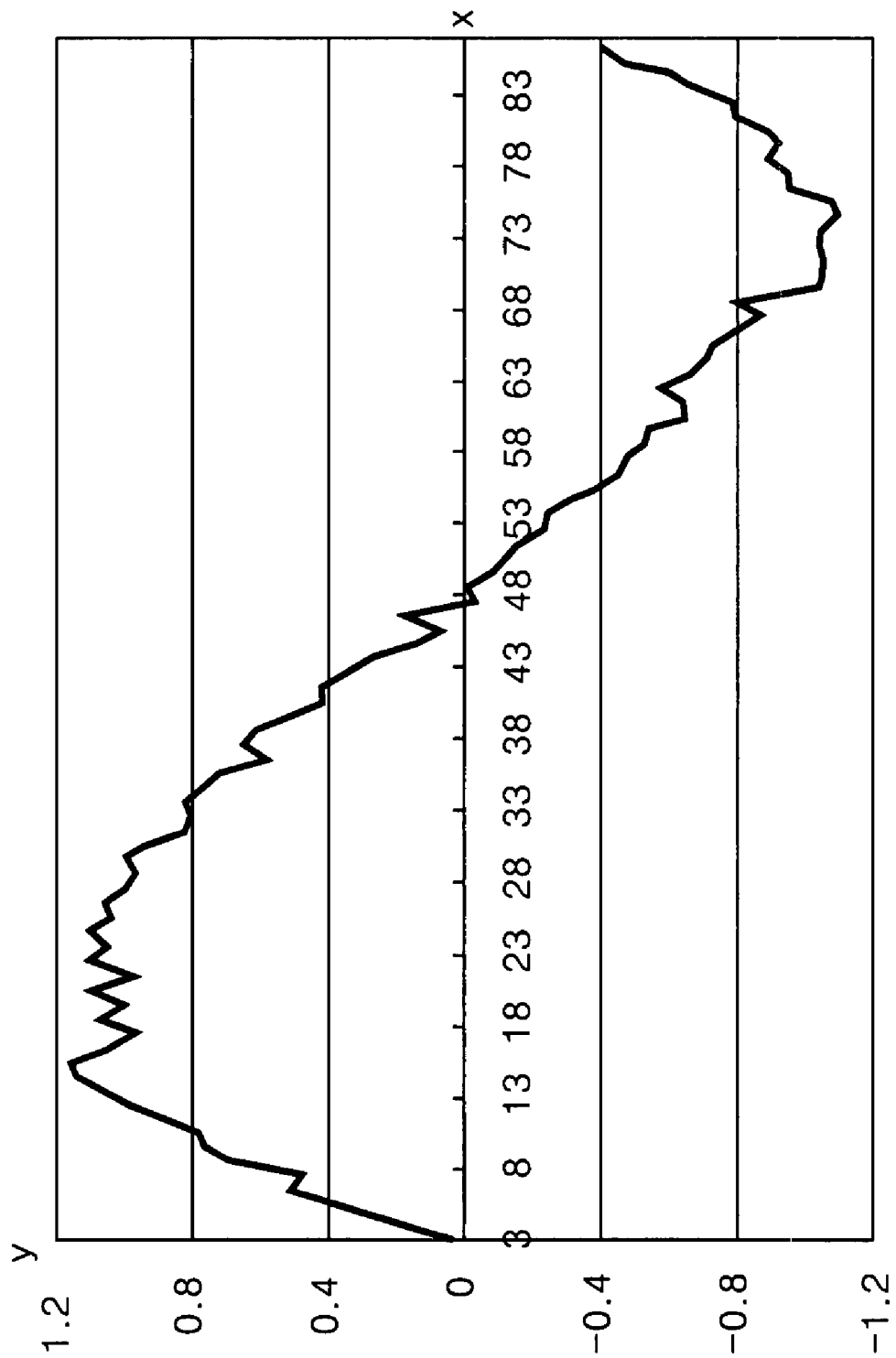
FIG. 18 is a graph representing an angle error between a calculated value and a measured value in the lens distortion compensation method according to the second embodiment of the present invention.

FIG. 18 is an example representing an angle error between a calculated value and a measured value. In FIG. 18, x-axis is a calculated value for N touch points, and y axis is an angle error for N touch points. In order to make an angle error curve more accurate and to obtain an accurate angle error value as in FIG. 18, the lens distortion compensation method according to the second embodiment of the present invention performs a polynomial curve fitting in use of a third-order or higher-order polynomial expression as in Mathematical Formula 4. (S105)

[Mathematical Formula 4]

$$y = a_0 + a_1 x + a_2 x^2 + a_3 x^3 \quad (1)$$

$$y = xa \quad (2)$$

$$\hat{a} = (x^T x)^{-1} x^T y \quad (3)$$

Herein, 'x' is an angle calculation value (N×4 matrix) for each touch point, 'y' is an error value (N×1 matrix) between the measurement value and the calculation value for each touch point, and 'a' is a third-order polynomial coefficient (4×1 matrix). (1) of Mathematical Formula 4 is a third-order polynomial expression for fitting a camera error curve, and (2) of Mathematical Formula 4 is made from the relationship between N measurement values and the error values thereof. And, (3) of Mathematical Formula 4 is a numerical expression induced by applying Linear Least Square to (2) of Mathematical Formula 4 and represents 'a' value which minimize the size of the Euclidean norm for 'y−xa'.

Figure 19:
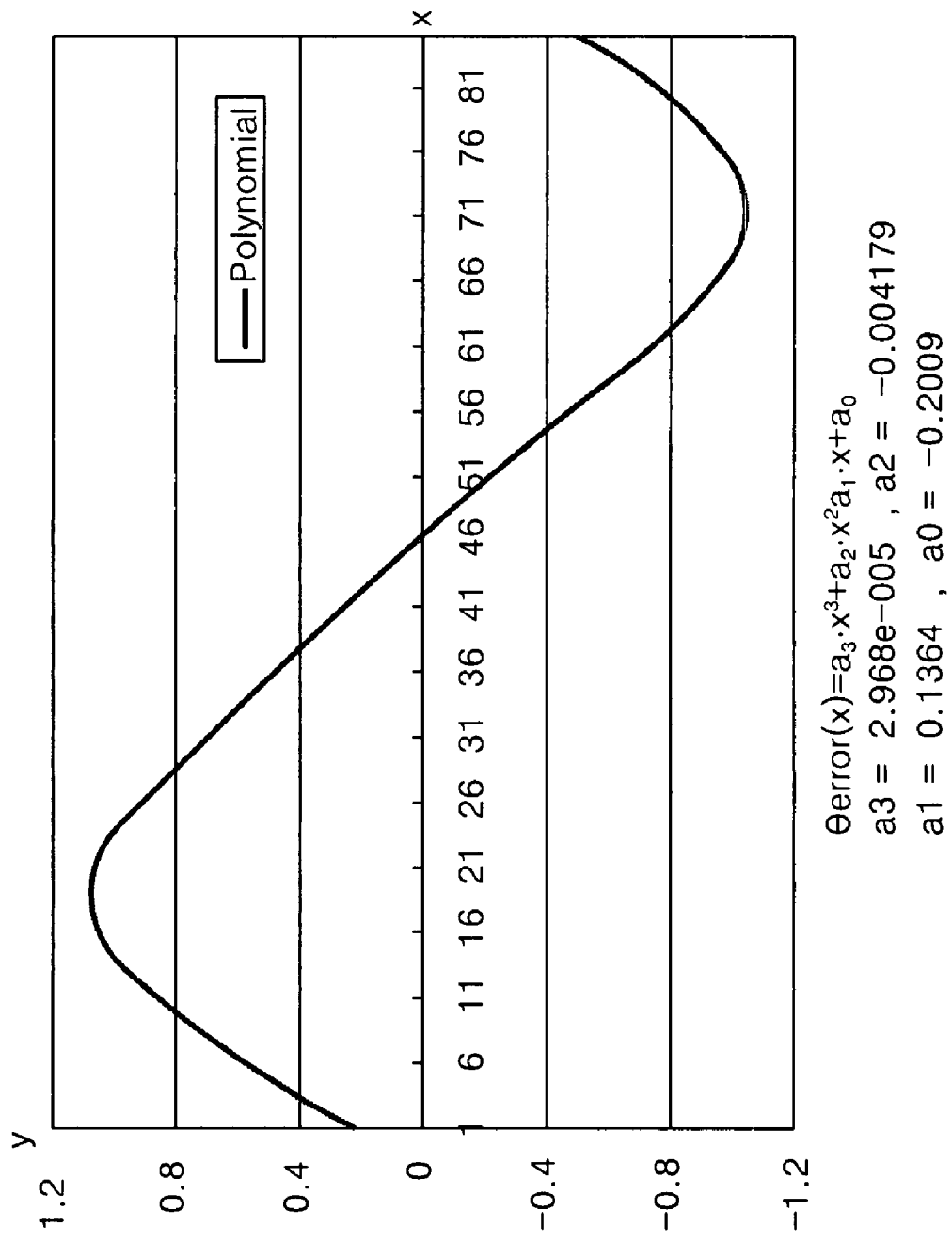
FIG. 19 is a graph representing the curve of a lens distortion angle error that is modified by performing a polynomial curve fitting for the angle error curve of FIG. 18.

FIG. 19 is a graph representing a lens distortion angle error curve that is modified by performing the polynomial curve fitting for the angle error curve of FIG. 18. The lens distortion angle error curve is approximated by the polynomial expression having the polynomial coefficients which are calculated by Mathematical Expression 3. The error data inclusive of polynomial coefficient data are the compensation angles $\theta_{error}$, and are mapped for each angle to be stored at the memory, thereby forming a lookup table. (S106)

The data of the compensation angle $\theta_{error}$ obtained by the lens distortion compensation method according to the first or second embodiment of the present invention are added to the measurement angles to compensate the lens distortion.

Figure 20:
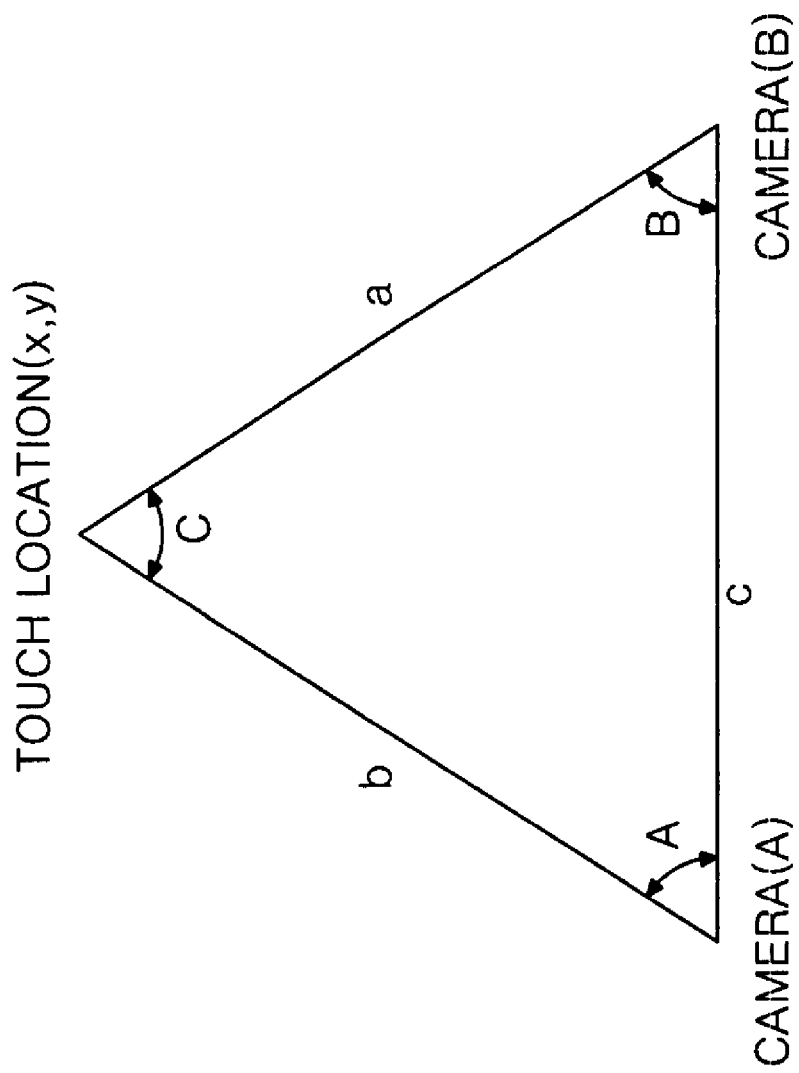
FIG. 20 is a diagram for explaining the triangulation.

Referring back to FIG. 6, the multi-touch signal processing program calculates the location in the two-dimensional plane for each effective touch location in use of the triangulation as in Mathematical Formula 4 from the measurement angle θ where the lens distortion is compensated, in the step of S8. (S9) Mathematical Formula 5 is a numerical expression for calculating one touch location as a two-dimensional xy coordinate value, and includes measurement angles A, B of two cameras, angle C between the touch location and the cameras, and distances a, b, c between the two cameras and the touch location as shown in FIG. 20. The angle C between the touch location and the cameras are calculated by "C=180−A−B".

$$a = c * \frac{\sin A}{\sin B}$$ [Mathematical Formula 5]

$$b = c * \frac{\sin B}{\sin C}$$

$$x = b * \cos A$$

$$y = b * \sin A$$

In this way, if the x, y coordinate data (Txy) for each touch location is calculated from the multi-touch signal processing program, the system 40 generates touch data in use of the coordinate data thereof and compounds the touch data with the background image which is to be displayed in the liquid crystal display panel 10. The touch data compounded with the background data is transmitted to the timing controller 31 to be displayed in the liquid crystal display panel 10. (S10) The touch data compounded with the background image can be made into various forms in accordance with the user's convenience.

Figure 21:
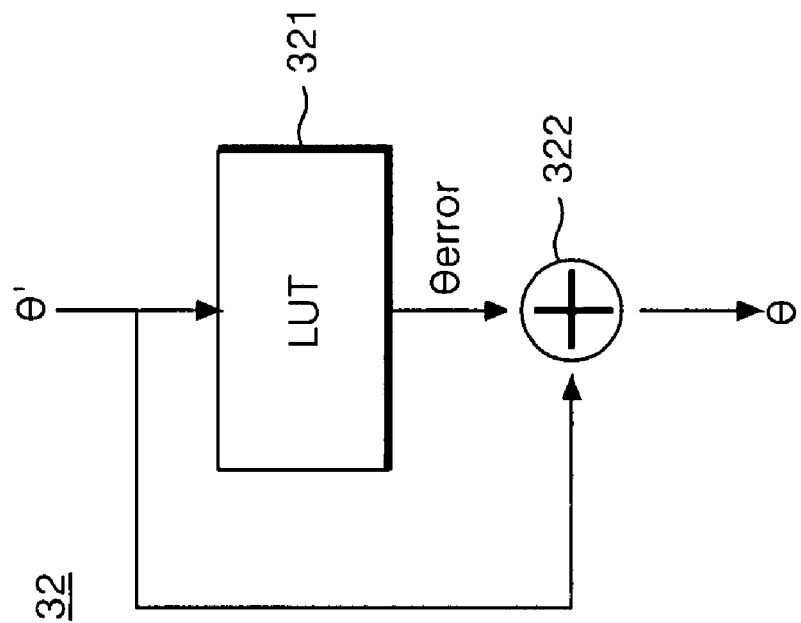
FIG. 21 is a circuit diagram representing a measurement angle compensation circuit of a multi-touch processor.

FIG. 21 represents a measurement angle compensation circuit of a multi-touch processor 32. Referring to FIG. 21, the multi-touch processor 32 includes a lookup table 321 to which the measurement angles θ' inclusive of the distortion amount caused by the lens aberration are inputted; and an adder 322 connected to the output terminal of the lookup table 321.

The lookup table 321 includes a memory which stores the compensation angle $\theta_{error}$ of 0°-90°; and a memory controller for controlling the read/write of the memory. Because the memory at which the lookup table 321 is stored has its lens distortion different from each lens, desirable to select EEPROM (electrically erasable and programmable read only memory) as the memory such that the compensation angle $\theta_{error}$ can be renewed in accordance with the lens characteristic. The lookup table 321 outputs the compensation angle $\theta_{error}$ pertinent to the measurement angle θ' by having the measurement angle θ' inclusive of the distortion amount caused by the lens aberration as a lead address.

The adder 322 outputs adds the compensation angle $\theta_{error}$ from the lookup table 321 to the measurement angle θ' inclusive of the distortion amount caused by the lens aberration, thereby outputting the measurement angle θ that the distortion amount is compensated.

In the multi-touch location calculation process of S9, the driving method of the display device having the multi-touch recognition function according to the embodiment of the present invention might include a process of verifying the locations of the touch points calculated by the triangulation, as in Mathematical Formula 4.

Figure 22:
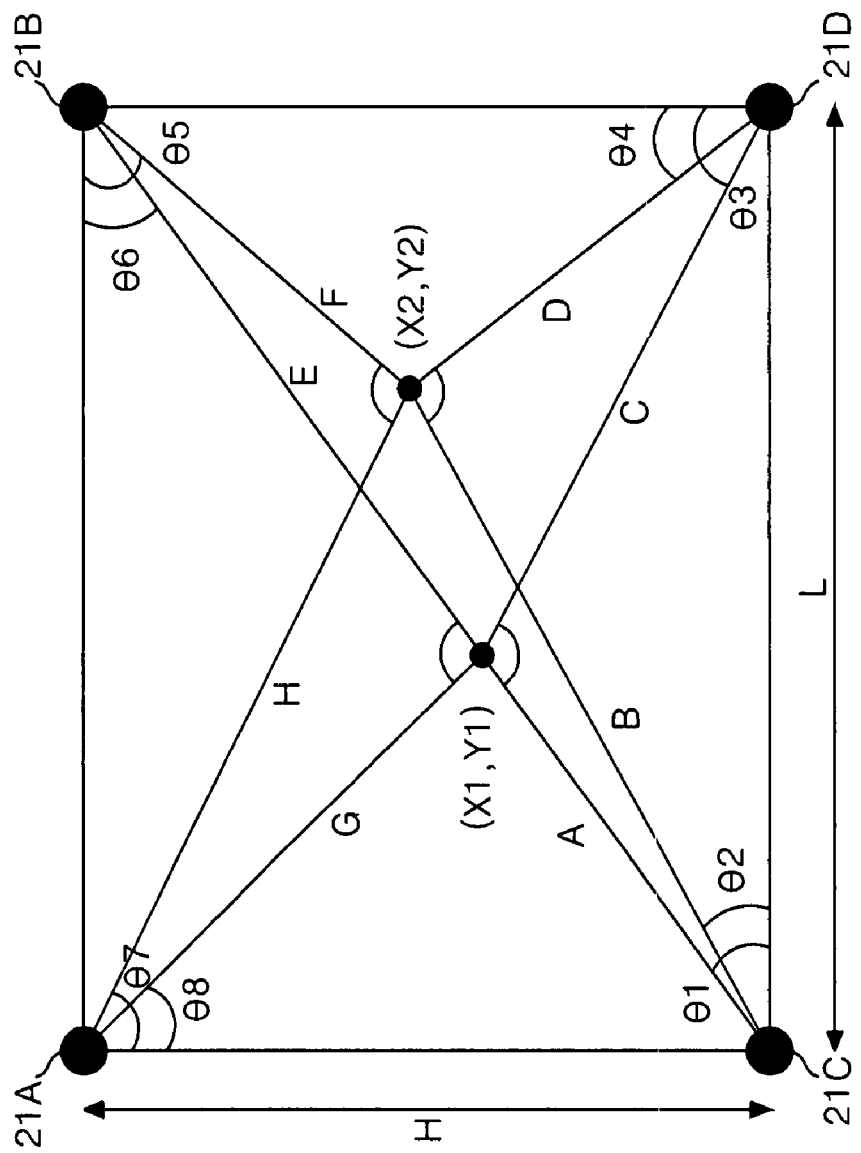
FIG. 22 is a diagram showing a verification process for each location of touch points.

FIG. 22 is a diagram showing a verification process for each location of the touch points. Referring to FIG. 22, assuming that there are two multi-touch points (X1,Y1), (X2, Y2) on the display surface 10A, the triangulation result of four pairs of cameras (21C and 21D, 21A and 21B, 21B and 21D, 21A and 21C) which are adjacent to each other for each of the two points is compared and decided, as in Mathematical Formula 6.

X1:A×cos(θ1)&&(L−C×sin(θ3))&&(H−E×cos(θ6))
&&G×sin(θ8)

Y1:A×sin(θ1)&&(L−C×cos(θ3))&&(H−E×sin(θ6))
&&G×cos(θ8)

X2:B×cos(θ2)&&(L−D×sin(θ4))&&(H−F×cos(θ5))
&&H×sin(θ7)

Y2:B×sin(θ2)&&(L−D×cos(θ4))&&(H−F×sin(θ5))
&&H×cos(θ7)                     [Mathematical Formula 6]

In Mathematical Formula 6, each of variables is as in FIG. 22.

Figure 23:
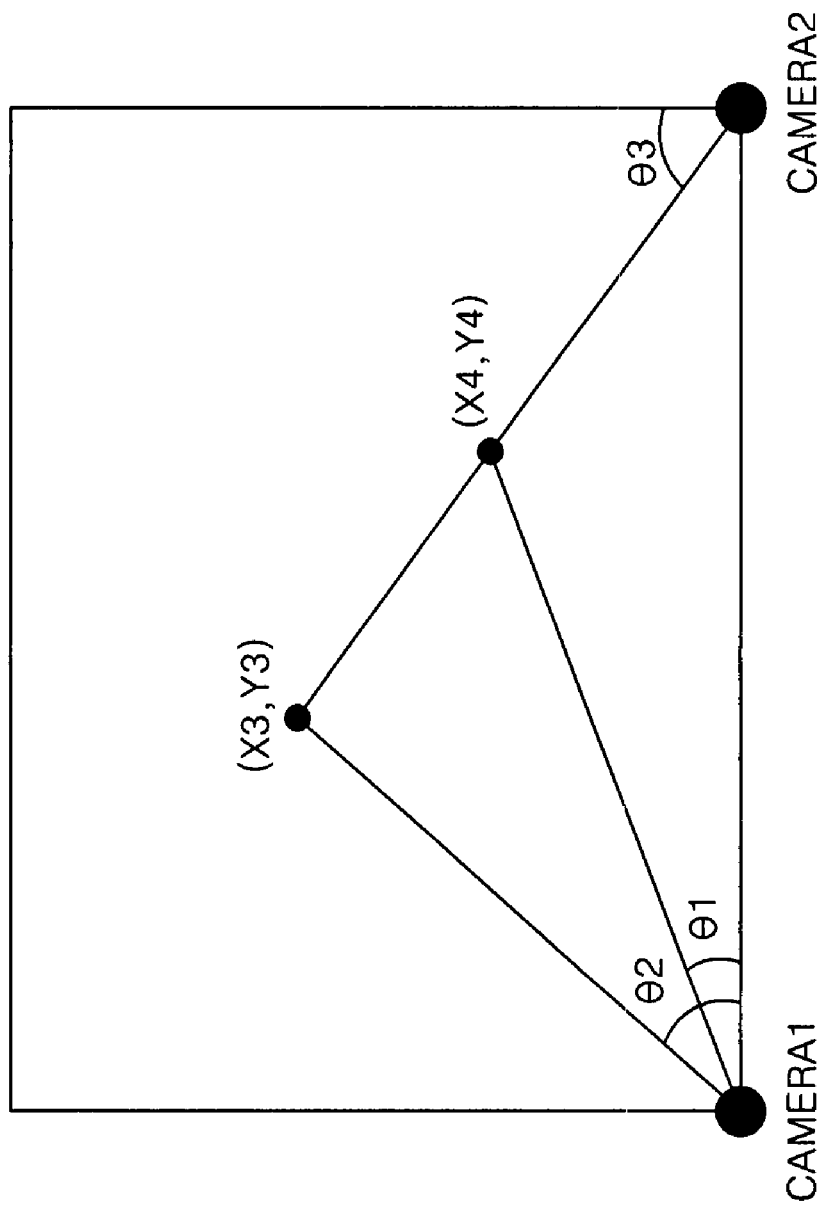
FIG. 23 shows an exemplary detection of two touch locations aligned with one of the cameras using two cameras.

FIG. 23 shows an exemplary detection of two touch locations aligned with one of the cameras. Referring to FIG. 23, two touch locations (X3, Y3) and (X4, Y4) are aligned with Camera 2. For example, the two touch locations (X3, Y3) and (X4, Y4) can be on a diagonal of the display panel. Camera 1 can detect the two touch locations (X3, Y3) and (X4, Y4) as distinct touch locations because the angle θ1 and θ2 of the two touch locations (X3, Y3) and (X4, Y4) with respect to Camera 1, respectively, are distinct. In contrast, Camera 2 cannot discriminate between the two touch locations (X3,Y3) and (X4, Y4) on the basis of the measured angle θ3. Specifically, both touch locations touch locations (X3, Y3) and (X4, Y4) are detected on the same line-of-sight with respect to Camera 2.

Figure 24:
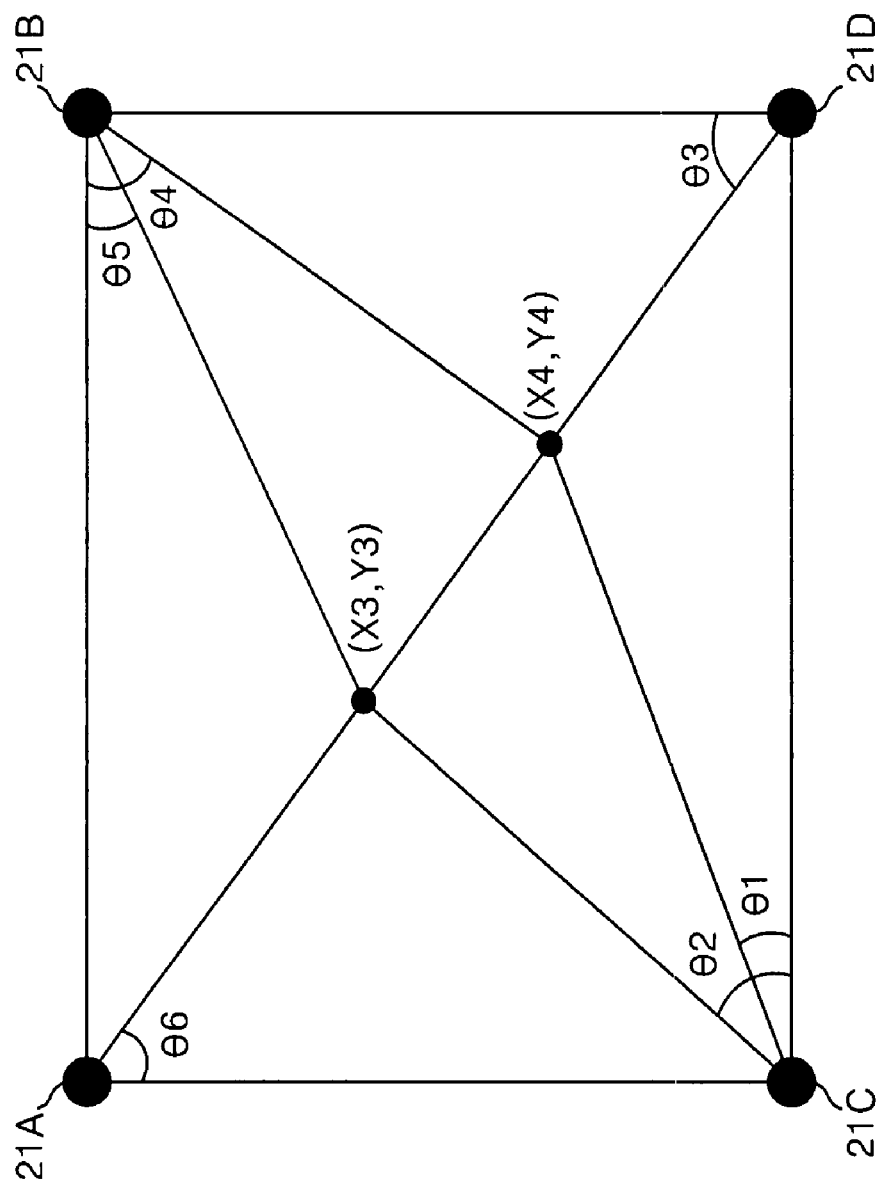
FIG. 24 shows an exemplary detection of two touch locations aligned with one or more of the cameras using four cameras.

FIG. 24 shows an exemplary detection of two touch locations aligned with one or more of the cameras using four cameras. Referring to FIG. 24, two touch locations (X3, Y3) and (X4, Y4) are aligned with Cameras 21A and 21D. For example, the two touch locations (X3, Y3) and (X4, Y4) can be on a diagonal of the display panel. Each of cameras 21B and 21C can detect the two touch locations (X3, Y3) and (X4, Y4) as distinct touch locations because the angle θ1 and θ2 of the two touch locations (X3, Y3) and (X4, Y4) with respect to camera 21C, respectively, are distinct and the angle θ5 and θ4 of the two touch locations (X3, Y3) and (X4, Y4) with respect to camera 21B, respectively, also are distinct. In contrast, none of the cameras 21A and 21D can discriminate between the two touch locations (X3, Y3) and (X4, Y4) on the basis of the measured angles θ3 and θ6, respectively. Specifically, both touch locations touch locations (X3, Y3) and (X4, Y4) are detected on the same line-of-sight with respect to each of the cameras 21A and 21D. In an embodiment, the positions of the points (X3, Y3) and (X4, Y4) can be determined by triangulation using cameras 21A and 21C followed by triangulation and verification by cameras 21B and 21D.

The multi-touch signal processing program does not take the location as the touch location if the error value of the location measured by the adjacent camera pairs (21C and 21D, 21A and 21B, 21B and 21D, 21A and 21C) in the verification process, as in FIG. 22 and Mathematical Formula 6, exceeds the pre-set critical value, thereby deciding it as an error.

The display device and the driving method thereof having the multi-touch recognition function according to the embodiment of the present invention can not only minimize the deterioration factor of the aperture ratio by disposing the cameras in the area except the pixel array, but can also minimize the deterioration of the structural stability without the appearance deformation of the integrated display device by integrating the touch recognition module with the liquid crystal display module. Particularly, the present invention compensates the distortion of the measurement angle between the touch location and the camera generated due to the unique characteristic of the lens to prevent the mis-recognition of the touch location, thereby making it possible to accurately sense each touch location.

On the other hand, the touch and display integration module 20 can have the liquid crystal display panel 10 and the cameras separated. And, in this case, the present invention installs a detachable instrument in the liquid crystal display panel 10 and the camera module such that the liquid crystal display panel 10 and the camera module can be structurally assembled. Further, tie liquid crystal display panel 10 of the touch and display integration module 20 can be replaced with other flat display panels, e.g., a display panel of an organic light emitting diode OLED, a plasma display panel PDP, a display panel of a field emitting display FED, or a display panel of a three-dimensional image display device inclusive of the flat display panel.

As described above, the display device and the driving method thereof having the multi-touch recognition function according to the embodiment of the present invention can accurately detect each touch location by compensating the lens distortion of the cameras which take multi-touch images, and can also optimize the circuit that controls a liquid crystal display module and processes the touch recognition as a signal.

It will be apparent to those skilled in the art that various modifications and variations can be made in embodiments of the present invention. Thus, it is intended that embodiments of the present invention cover the modifications and variations of the embodiments described herein provided they come within the scope of the appended claims and their equivalents.

What is claimed is:

1. A display device having a multi-touch recognition function, comprising:
   an integration module having a plurality of cameras integrated at an edge of a display panel;
   a processor that detects a touch area using at least first and second images captured by the plurality of cameras, respectively, and compensates the detected touch area with one of the plurality of compensation angles, the processor including:
   a memory that stores a plurality of compensation angles in a range of 0 to 90 degrees corresponding to each of the plurality of cameras; and
   an adder connected to the output terminal of the look-up-table, which adds the compensation angle from the memory to a measurement angle inclusive of the distortion amount caused by lens aberration,
   wherein the processor is operated in synchronization with a timing controller by a timing signal,
   wherein the compensation angles 'θ error' are defined by steps comprising:
   calculating an accurate measurement angle θ using θ=arc tan(A), wherein A is an actual touch area;
   calculating a mis-recognized measurement angle θ' using the following equations:

$$A'=c \times (A \times \sin(90-\theta))$$

$$\theta'=\arc \tan(A')$$

calculating the compensation angle using θerror=θ−θ'
   wherein 'c' is a constant value, i.e., lens coefficient, representing a unique characteristic of lens having a value of 0<c≦1.

2. The display device of claim 1, wherein the compensation angles are symmetric with respect to 45 degrees.

3. The display device of claim 1, wherein each of the compensation angles characterizes a distortion at the corresponding angle with respect to an axis of the corresponding camera.

4. A method of recognizing a multi-touch on a display device including an integration module having a plurality of cameras assembled with a display panel and a storage part for storing a plurality of compensation angles in an range of 0 to 90 degrees corresponding to each of the plurality of cameras, the method comprising:
   operating in synchronization between a processor and a timing controller by a timing signal;
   capturing first and second images using the cameras;
   detecting a touch area using the first and second images; and
   compensating the detected touch area with one of the plurality of compensation angles, by adding at least one of the compensation angles from a memory to a measurement angle inclusive of the distortion amount caused by lens aberration,
   wherein the compensation angles 'θerror' are defined by steps comprising:
   calculating an accurate measurement angle θ using θ=arc tan(A), wherein A is an actual touch area;
   calculating a mis-recognized measurement angle θ' using the following equations:

$$A'=c \times (A \times \sin(90-\theta))$$

$$\theta'=\arc \tan(A')$$

calculating the compensation angle using θerror=θ−θ'
   wherein 'c' is a constant value, i.e., lens coefficient, representing a unique characteristic of lens having a value of 0<c≦1.

5. The method of claim 4, wherein the compensation angles are symmetric with respect to 45 degrees.

6. The method of claim 4, wherein each of the compensation angles characterizes a distortion at the corresponding angle with respect to an axis of the corresponding camera.

7. A method of recognizing a multi-touch on a display panel of display device including first and second capture devices assembled with the display panel, comprising:
   operating in synchronization between a processor and a timing controller by a timing signal;
   capturing a first captured image of a touched first reference on a surface of the display panel using the first capture device wherein the first reference has first and second reference angles relative to the first and second capture device;
   capturing a second captured image of the touched first reference using the second capture device;
   detecting first and second contact angles of the touched first reference relative to the first and second capture devices, respectively, by a triangulation operation on a basis of the first and second captured images;
   computing first and second compensation angles corresponding to the first and second capture devices, respectively, in accordance with corresponding differences between the first and second reference angles and the first and second contact angles, respectively, and
   adding at least one of the first and second compensation angles from a memory to a measurement angle inclusive of the distortion amount caused by lens aberration,
   wherein the compensation angles 'θerror' are defined by steps comprising:
   calculating an accurate measurement angle θ using θ=arc tan(A), wherein A is an actual touch area;
   calculating a mis-recognized measurement angle θ'using the following equations:

$$A'=c \times (A \times \sin(90-\theta))$$

$$\theta'=\arc \tan(A')$$

calculating the compensation angle using θerror=θ−θ'
   wherein 'c' is a constant value, i.e., lens coefficient, representing a unique characteristic of lens having a value of 0<c≦1.

8. The method of claim 7, further comprising fitting the first and second compensation angles to a substantially polynomial curve.

9. The method of claim 8, further comprising storing a plurality of coefficients corresponding to the substantially polynomial curve in a rewritable storage part.

10. A method of recognizing a multi-touch on a display device including an integration module having a plurality of cameras assembled with a display panel and a storage part for storing a plurality of compensation angles in an range of 0 to 90 degrees corresponding to each of the plurality of cameras, the method comprising:

operating in synchronization between a processor and a timing controller by a timing signal;

substantially simultaneously capturing first, second, third and fourth images using first, second, third and fourth cameras from the plurality of cameras;

detecting one or more touch area using the first and second images;

detecting the one or more touch area using the third and fourth images;

compensating the detected one or more touch area with compensation angles corresponding to the first, second, third and fourth cameras, respectively;

verifying the one or more touch area detected using the first and second images with the one or more touch area detected using the third and fourth cameras, and adding at least one of the compensation angle from a memory to a measurement angle inclusive of the distortion amount caused by lens aberration, wherein the compensation angles 'θerror' are defined by steps comprising:

calculating an accurate measurement angle θ using θ=arc tan(A), wherein A is an actual touch area;

calculating a mis-recognized measurement angle θ' using the following equations:

$$A'=c \times (A \times \sin(90-\theta)$$

$$\theta'=\arc\tan(A')$$

calculating the compensation angle using θerror=θ−θ' wherein 'c' is a constant value, i.e., lens coefficient, representing a unique characteristic of lens having a value of 0<c≦1.

11. A method of recognizing a multi-touch on a display panel of display device including a capture device assembled with the display panel, comprising:

operating in synchronization between a processor and a timing controller by a timing signal;

selecting a reference on a surface of the display panel, the reference having a reference angle relative to the capture devices;

touching the selected reference;

capturing an image of the touched reference using the capture device;

calculating a touched angle of the touched reference using the captured image;

computing a compensation angle according to a difference between the touched angle and the reference angle, and adding the compensation angle from a memory to a measurement angle inclusive of the distortion amount caused by lens aberration, wherein the compensation angles 'θerror' are defined by steps comprising:

calculating an accurate measurement angle θ using θ=arc tan(A), wherein A is an actual touch area;

calculating a mis-recognized measurement angle θ' using the following equations:

$$A'=c \times (A \times \sin(90-\theta)$$

$$\theta'=\arc\tan(A')$$

calculating the compensation angle using θerror=θ−θ' wherein 'c' is a constant value, i.e., lens coefficient, representing a unique characteristic of lens having a value of 0<c≦1.

* * * * *